(12) United States Patent
Chao et al.

(10) Patent No.: US 12,440,188 B2
(45) Date of Patent: Oct. 14, 2025

(54) GRAPHICAL LONGITUDINAL DISPLAY FOR INTRALUMINAL ULTRASOUND IMAGING AND ASSOCIATED DEVICES, SYSTEMS, AND METHODS

(71) Applicant: VOLCANO CORPORATION, San Diego, CA (US)

(72) Inventors: Pei-Yin Chao, Eindhoven (NL); Anuja Nair, San Diego, CA (US); Nikhil Sreedhar Rajguru, San Diego, CA (US); Yvonne Gillis, San Diego, CA (US)

(73) Assignee: PHILIPS IMAGE GUIDED THERAPY CORPORATION, San Diego, CA (US)

( * ) Notice: Subject to any disclaimer, the term of this patent is extended or adjusted under 35 U.S.C. 154(b) by 448 days.

(21) Appl. No.: 16/663,020

(22) Filed: Oct. 24, 2019

(65) Prior Publication Data

US 2020/0129158 A1 Apr. 30, 2020

Related U.S. Application Data

(60) Provisional application No. 62/751,289, filed on Oct. 26, 2018.

(51) Int. Cl.
*A61B 8/00* (2006.01)
*A61B 8/12* (2006.01)

(52) U.S. Cl.
CPC .............. *A61B 8/5207* (2013.01); *A61B 8/12* (2013.01); *A61B 8/461* (2013.01); *A61B 8/5215* (2013.01); *A61B 8/523* (2013.01)

(58) Field of Classification Search
CPC ......... A61B 8/5207; A61B 8/12; A61B 8/461; A61B 8/5215; A61B 8/0841; A61B 8/5223; A61B 8/523; A61B 8/463; A61B 8/465; G06T 11/003
See application file for complete search history.

(56) References Cited

U.S. PATENT DOCUMENTS

| | | |
|---|---|---|
| 6,200,268 B1 | 3/2001 | Vince |
| 6,381,350 B1 | 4/2002 | Klingensmith |
| 7,074,188 B2 | 7/2006 | Nair |
| 7,175,597 B2 | 2/2007 | Vince |
| 7,215,802 B2 | 5/2007 | Klingensmith |
| 7,359,554 B2 | 4/2008 | Klingensmith |

(Continued)

FOREIGN PATENT DOCUMENTS

WO 2019175004 A1 9/2019

*Primary Examiner* — Joel Lamprecht

(57) ABSTRACT

Disclosed is an intraluminal ultrasound imaging system, including a processor circuit in communication with an intraluminal ultrasound imaging catheter, and configured to receive a plurality of intraluminal ultrasound images obtained by the imaging catheter while the imaging catheter is moved through a body lumen of a patient, wherein the plurality of intraluminal ultrasound images comprise axial cross-sectional views of the body lumen. The processor circuit is further configured to generate a stylized graphic of the body lumen based on the plurality of intraluminal ultrasound images, wherein the stylized graphic comprises a longitudinal cross-sectional view of the body lumen, and output, to a display in communication with the processor circuit, a screen display comprising the stylized graphic.

19 Claims, 14 Drawing Sheets

(56) References Cited

U.S. PATENT DOCUMENTS

| | | |
|---|---|---|
| 7,463,759 B2 | 12/2008 | Klingensmith |
| 7,846,101 B2 | 12/2010 | Eberle |
| 7,930,014 B2 | 4/2011 | Huennekens |
| 8,298,147 B2 | 10/2012 | Huenneken |
| 2006/0058624 A1* | 3/2006 | Kimura ................. A61B 5/7425 600/407 |
| 2010/0312120 A1* | 12/2010 | Meier ....................... A61B 8/00 600/459 |
| 2012/0130243 A1 | 5/2012 | Balocco |
| 2014/0276085 A1* | 9/2014 | Miller .................. A61B 5/0066 600/467 |
| 2015/0073279 A1* | 3/2015 | Cai ...................... A61B 8/5207 600/463 |
| 2015/0257850 A1 | 9/2015 | Sakamoto |
| 2015/0297373 A1* | 10/2015 | Schmitt .................. G16H 50/20 623/1.16 |
| 2016/0166232 A1* | 6/2016 | Merritt ..................... A61B 8/12 623/1.11 |
| 2016/0171711 A1* | 6/2016 | Gopinath ............... G06T 19/20 382/130 |
| 2018/0085170 A1* | 3/2018 | Gopinath ............... A61B 34/10 |
| 2019/0282199 A1 | 9/2019 | Merritt |

* cited by examiner

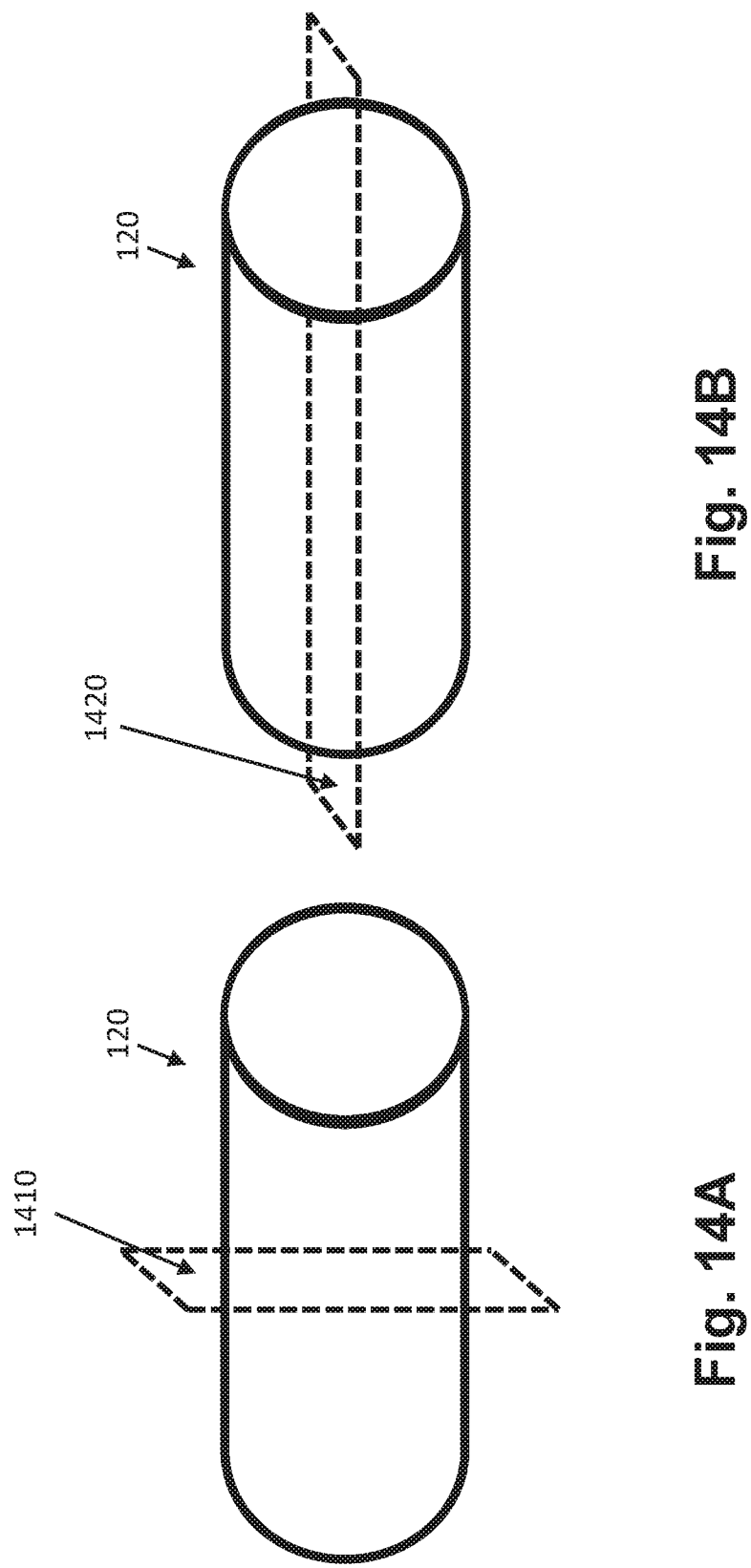

GRAPHICAL LONGITUDINAL DISPLAY FOR INTRALUMINAL ULTRASOUND IMAGING AND ASSOCIATED DEVICES, SYSTEMS, AND METHODS

CROSS REFERENCE TO RELATED APPLICATIONS

This application claims priority to and the benefit of U.S. Provisional Patent Application No. 62/751,289, filed Oct. 26, 2018, which is incorporated by reference herein in its entirety.

TECHNICAL FIELD

The subject matter described herein relates to a system for medical imaging. In particular, the disclosed system provides a graphical longitudinal display in a simplified visual format to facilitate acquisition and interpretation of peripheral intravascular ultrasound or IVUS images during a pullback procedure. This system has particular but not exclusive utility for diagnosis and treatment of vascular diseases.

BACKGROUND

Peripheral vascular procedures, such as angioplasty and stenting in peripheral venous (Inferior Vena Cava—IVC, iliac, femoral veins), IVC-filter retrieval, EVAR and FEVAR (and similar on the abdominal trait) atherectomy and thrombectomy are procedures where IVUS is used. Different diseases or medical procedures produce physical features with different size, structure, density, water content, and accessibility for imaging sensors. For example, a deep-vein thrombosis (DVT) produces a clot of blood cells, whereas post-thrombotic syndrome (PTS) produces webbing or other residual structural effects in a vessel that have similar composition to the vessel wall itself, and may thus be difficult to distinguish from the vessel wall. A stent is a dense (e.g., metallic) object that may be placed in a vessel or lumen to hold the vessel or lumen open to a particular diameter. A compression occurs when anatomical structures outside the vessel or lumen impinge on the vessel or lumen, constricting it.

In some cases, intraluminal imaging is carried out with an IVUS device including one or more ultrasound transducers. The IVUS device may be passed into the vessel and guided to the area to be imaged. The transducers emit ultrasonic energy and receive ultrasound echoes reflected from the vessel. The ultrasound echoes are processed to create an image of the vessel of interest. The image of the vessel of interest may include one or more lesions or blockages in the vessel. A stent may be placed within the vessel to treat these blockages and intraluminal imaging may be carried out to view the placement of the stent within the vessel. Other types of treatment include thrombectomy, ablation, angioplasty, pharmaceuticals, etc.

During a typical intraluminal imaging procedure (e.g., an IVUS pullback), an intraluminal imaging probe (e.g., an IVUS catheter) is pulled or pushed manually by a clinician. A typical user interface may include a tomographic display showing the most recently captured IVUS image (i.e., a tomographic section) and an In-Line Digital or Image Longitudinal Display (ILD) view showing a plurality of cross-sectional views of the captured IVUS images, forming an image of the entire length of the vessel or lumen transited by the imaging probe thus far. IVUS users can use the ILD to navigate the IVUS sensor through a pullback procedure, and if the right cross-section angle (sometimes referred to as a clock angle or noon angle) is depicted, useful clinical data points like side branches of the vessel or lumen can be seen.

The ILD may grow longer in real time as additional images are captured, and a clinician may "eyeball" the ILD to develop a sense of the location and severity of diseased, compressed, or otherwise constricted sections of the lumen. However, accurate assessment (both pre- and post-treatment) of vessels or lumens requires detailed measurement of diameter, area, percent constriction, percent improvement, and other variables based on representative IVUS images for both target areas and reference areas within the vessel or lumen. Such calculations take time, and may require interaction with nonsterile equipment. In addition, even when such parameters are known, they are not directly associated with particular locations within the vessel, until a report is generated that includes annotated tomographic and longitudinal images.

The information included in this Background section of the specification, including any references cited herein and any description or discussion thereof, is included for technical reference purposes only and is not to be regarded as subject matter by which the scope of the disclosure is to be bound.

SUMMARY

Disclosed is a system for advantageously displaying the measured or computed dimensions of a lumen (e.g., a vein) in a "graphical image longitudinal display" or GILD format that is readily comprehensible at a glance by clinicians and other users, permitting rapid assessment of the location and severity of diseases, compressions, and other constrictions of the lumen, both during image capture and in post-pullback analysis. According to at least one embodiment of the present disclosure, a system is provided for representing a plurality of tomographic images in a longitudinal format, using a graphical representation that indicates the diameter, area, percent compression, or percent improvement of the lumen at each location along the image sequence. This permits clinicians to view a single screen display that includes clinically relevant data from a plurality of intraluminal ultrasound images. The system is hereinafter referred to as a graphical longitudinal display system.

The graphical longitudinal display system disclosed herein has particular, but not exclusive, utility for intraluminal ultrasound imaging procedures. The graphical longitudinal display system includes an intraluminal ultrasound imaging system, including: a processor circuit configured for communication with an intraluminal ultrasound imaging catheter, where the processor circuit is configured to: receive a plurality of intraluminal ultrasound images obtained by the intraluminal ultrasound imaging catheter while the intraluminal ultrasound imaging catheter is moved through a body lumen of a patient, where the plurality of intraluminal ultrasound images include axial cross-sectional views of the body lumen; generate a stylized graphic of the body lumen based on the plurality of intraluminal ultrasound images, where the stylized graphic includes a longitudinal cross-sectional view of the body lumen; and output, to a display in communication with the processor circuit, a screen display including the stylized graphic.

Implementations may include one or more of the following features. The system where the processor circuit is configured to determine quantitative information representative of the body lumen based on the plurality of intraluminal ultrasound images, and where the screen display includes the quantitative information. The system where the processor circuit is configured to generate a smoothed lumen boundary or smoothed lumen measurement based on the plurality of intraluminal ultrasound images. The system where the stylized graphic includes the smoothed lumen boundary or smoothed lumen measurement. The system where the smoothed lumen boundary is symmetrical about a central longitudinal axis of the body lumen in the stylized graphic. The system where the processor circuit is configured to: generate a stacked arrangement of the plurality of intraluminal ultrasound images, where the stacked arrangement includes the longitudinal cross-sectional view of the body lumen; receive a user input to select the stylized graphic or the stacked arrangement; and output the stylized graphic or the stacked arrangement in the screen display, based on the user input. The system where the processor circuit is configured to generate a stacked arrangement of the plurality of intraluminal ultrasound images, where the stacked arrangement includes the longitudinal cross-sectional view of the body lumen. The system where the screen display simultaneously includes the stylized graphic and the stacked arrangement. The system where the processor circuit is further configured to output, in the screen display: an intraluminal ultrasound image of the plurality of intraluminal ultrasound images; and an indicator in the stylized graphic identifying a location of the intraluminal ultrasound image along a length of the body lumen. The system where the indicator is movable to a different location along the length of the body lumen in the stylized graphic. The system where the processor circuit is configured to output, via the screen display, the intraluminal ultrasound image corresponding to the different location. The system where processor circuit is configured to output the stylized graphic a horizontal orientation or a vertical orientation. The system where the processor circuit is configured to: identify a treatment device positioned within the body lumen, based on the plurality of intraluminal ultrasound images; and output, via the screen display, an illustration of the treatment device in the stylized graphic. The system where the processor circuit is configured to: receive a further plurality of ultrasound images obtained after a treatment device is positioned within the body lumen; generate a further stylized graphic of the body lumen based on the further plurality of intraluminal ultrasound images; and output, via the screen display, the further stylized graphic proximate to the stylized graphic. The system where the processor circuit is configured to output, via the screen display, an intraluminal ultrasound image of the plurality of ultrasound images and a further intraluminal ultrasound image of the further plurality of ultrasound images. The system where the body lumen includes a plurality of segments, where the processor circuit is configured to: perform an automatic measurement for each of the plurality of segments, based on the plurality of intraluminal ultrasound images; and output, via the screen display, the automatic measurement proximate to each of the plurality of segments in the stylized graphic. The system where the automatic measurement includes at least one of an area, a diameter, a length, a compression percentage, or an improvement percentage. The system where the automatic measurement is displayed as at least one of a numerical value, a difference from a reference numerical value, a ratio of the reference numerical value, or a percentage of the reference numerical value. The system where the processor circuit is configured to: perform an automatic measurement for the body lumen, based on the plurality of intraluminal ultrasound images; identify at least one of a reference location or a target location, where the reference location corresponds to a healthy portion of the body lumen and the target location corresponds to a diseased or compressed portion of the body lumen; and output at least one of the reference location or a target location on the stylized graphic. The system where the body lumen includes a plurality of segments. The system where the processor circuit is configured to identify at least one of the reference location or the target location for each of the plurality of segments, and output at least one of the reference location or the target location for each of the plurality of segments on the stylized graphic. Implementations of the described techniques may include hardware, a method or process, or computer software on a computer-accessible medium.

One general aspect includes an intraluminal ultrasound imaging method, including: receiving, at processor circuit in communication with an intraluminal ultrasound imaging catheter, a plurality of intraluminal ultrasound images obtained by the intraluminal ultrasound imaging catheter while the intraluminal ultrasound imaging catheter is moved through a body lumen of a patient, where the plurality of intraluminal ultrasound images include axial cross-sectional views of the body lumen; generating, with the processor circuit, a stylized graphic of the body lumen based on the plurality of intraluminal ultrasound images, where the stylized graphic includes a longitudinal cross-sectional view of the body lumen; and outputting, to a display in communication with the processor circuit, a screen display including the stylized graphic. Other embodiments of this aspect include corresponding computer systems, apparatus, and computer programs recorded on one or more computer storage devices, each configured to perform the actions of the methods.

One general aspect includes an intravascular ultrasound imaging system for use in peripheral vasculature, the system including: an intravascular ultrasound imaging catheter configured to obtain a plurality of intravascular ultrasound images while the intravascular ultrasound imaging catheter is moved through a peripheral blood vessel of a patient; a processor circuit configured for communication with the intravascular ultrasound imaging catheter, where the processor circuit is configured to: receive the plurality of intravascular ultrasound images obtained by the intravascular ultrasound imaging catheter, where the plurality of intravascular ultrasound images include axial cross-sectional views of the peripheral blood vessel; generate a stylized graphic of the peripheral blood vessel based on the plurality of intravascular ultrasound images, where the stylized graphic includes a longitudinal cross-sectional view of the peripheral blood vessel; and output, to a display in communication with the processor circuit, a screen display including the stylized graphic. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the graphical longitudinal display system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 14a shows an axial/tomographic cross section of a lumen.

FIG. 14b shows a longitudinal cross-section of a lumen.

DETAILED DESCRIPTION

Figure 1:
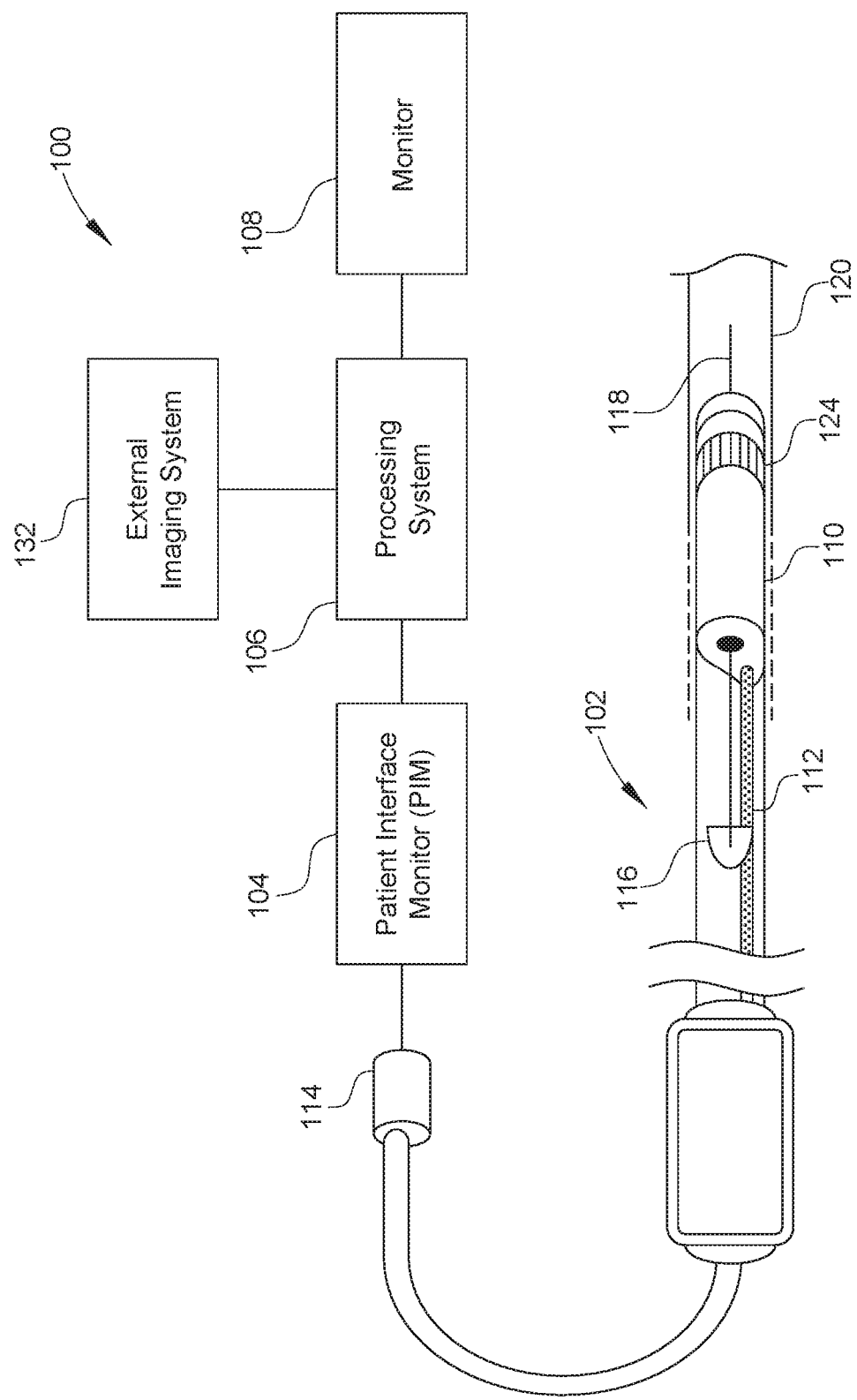
FIG. 1 is a diagrammatic schematic view of an intraluminal imaging system, according to aspects of the present disclosure.

The present disclosure relates generally to medical imaging, including imaging associated with a body lumen of a patient using an intraluminal imaging device. For example, the present disclosure describes systems, devices, and methods for visually summarizing images, measurements, and calculations acquired during an IVUS pullback procedure or other intravascular procedure. In accordance with at least one embodiment of the present disclosure, a system is provided for representing a plurality of tomographic images in a longitudinal format, using a graphical representation indicative of the diameter, area, percent compression, or percent improvement of the lumen at each location along the pullback. This permits clinicians and other users to view a single screen display that includes, in a visually simplified format, clinically relevant data from dozens or hundreds of intraluminal ultrasound images. This system is hereinafter referred to as a graphical longitudinal display system.

The devices, systems, and methods described herein can include one or more features described in U.S. Provisional App. No. 62/750,983, filed 26 Oct. 2018, U.S. Provisional App. No. 62/751,268, filed 26 Oct. 2018, U.S. Provisional App. No. 62/751,289, filed 26 Oct. 2018, U.S. Provisional App. No. 62/750,996, filed 26 Oct. 2018, U.S. Provisional App. No. 62/751,167, filed 26 Oct. 2018, and U.S. Provisional App. No. 62/751,185, filed 26 Oct. 2018, each of which is hereby incorporated by reference in its entirety as though fully set forth herein.

The devices, systems, and methods described herein can also include one or more features described in U.S. Provisional App. No. 62/642,847, filed Mar. 14, 2018 (and a Non-Provisional application filed therefrom on Mar. 12, 2019 as U.S. Ser. No. 16/351,175), U.S. Provisional App. No. 62/712,009, filed Jul. 30, 2018, U.S. Provisional App. No. 62/711,927, filed Jul. 30, 2018, and U.S. Provisional App. No. 62/643,366, filed Mar. 15, 2018 (and a Non-Provisional application filed therefrom on Mar. 15, 2019 as U.S. Ser. No. 16/354,970), each of which is hereby incorporated by reference in its entirety as though fully set forth herein.

The present disclosure substantially aids a clinician in making sense of large volumes of intraluminal imaging data, as well as reporting and treatment planning, and also reduces case time and improves ease of use. The present disclosure accomplishes this by providing visual, symbolic representations of the diameter, cross-sectional area, percent compression, and/or percent improvement of each location of a vessel or lumen along an examined length (e.g., during an IVUS pullback procedure). Implemented on a medical imaging console (e.g., an intraluminal imaging console) in communication with a medical imaging sensor (e.g., an intraluminal ultrasound sensor), the graphical longitudinal display system disclosed herein provides both time savings and an improvement in the quality and consistency of captured images. This improved imaging workflow transforms an irregular and time-consuming process of imaging, image selection, measurement, calculation, image annotation, and reporting into a streamlined process involving both fewer steps and simpler steps. This occurs for example without the normally routine need for clinicians to interpret images visually to find the single tomographic section most representative of a diseased or compressed state and the image most representative of a healthy state of a particular lumen, and then to perform measurements and calculations of quantitative information relating the diseased or compressed location to the healthy location in order to numerically score the constriction, and then create reports that include both IVUS images, a longitudinal image, and the measured or calculated values. This unconventional approach improves the functioning of the medical imaging console and sensor, by automating measurements and calculations normally performed, recorded, annotated, and reported by the clinician, and representing the results graphically in a simplified visual format on a display screen of the medical imaging console during the imaging procedure.

The graphical longitudinal display system may be implemented as a set of logical branches and mathematical operations, whose outputs are viewable on a display, and operated by a control process executing on a processor that accepts user inputs (e.g., from a keyboard, mouse, or touchscreen interface), and that is in communication with one or more medical imaging sensors (e.g., intraluminal ultrasound sensors). In that regard, the control process performs certain specific operations in response to different inputs or selections made by a user at the start of an imaging procedure, and may also respond to inputs made by the user during the procedure. Certain structures, functions, and operations of the processor, display, sensors, and user input systems are known in the art, while others are recited herein to enable novel features or aspects of the present disclosure with particularity.

Various types of intraluminal imaging systems are used in diagnosing and treating diseases. For example, intravascular ultrasound (IVUS) imaging is used as a diagnostic tool for visualizing vessels within a body of a patient. This may aid in assessing diseased or compressed vessels, such as arteries or veins, within the human body to determine the need for treatment, to optimize treatment, and/or to assess a treatment's effectiveness (e.g., through imaging of the vessel before and after treatment).

In some cases, intraluminal imaging is carried out with an IVUS device including one or more ultrasound transducers. The IVUS device may be passed into the vessel and guided to the area to be imaged. The transducers emit ultrasonic energy and receive ultrasound echoes reflected from the vessel. The ultrasound echoes are processed to create an image of the vessel of interest. The image of the vessel of interest may include one or more lesions or blockages in the vessel. A stent may be placed within the vessel to treat these blockages and intraluminal imaging may be carried out to view the placement of the stent within the vessel. Other types of treatment include thrombectomy, ablation, angioplasty, pharmaceuticals, etc.

In some embodiments, the graphical longitudinal display system includes screen displays that provide a clinician with a visual summary of image data during an IVUS pullback in peripheral vasculature, or other intravascular imaging procedure. The screen displays provide real-time, pre-treatment and post-treatment feedback on the location and severity of luminal constrictions such as venous diseases.

When recording an IVUS pullback, the IVUS system successively stacks a cross-section of each recorded tomographic frame onscreen. The resulting image stack is called the In Line Digital or Image Longitudinal Display (ILD) view. IVUS users can use the ILD to navigate the sensor through a pullback, and if the right ILD cross-section angle is depicted, useful clinical data points like side branches of the vessel or lumen can also be seen in the ILD.

The present disclosure introduces a graphical longitudinal display, which may be referred to as a Graphical ILD (GILD). Instead of a IVUS frame cross-sections, the GILD stacks key clinical measurements (e.g., quantitative information such as vessel diameter or area) of each IVUS frame horizontally next to each other or vertically underneath each other. It also shows pullback level information such as bookmarks and segment labels corresponding to venous anatomy.

IVUS pullback measurements results require interpretation, calculation, recording, annotation, and reporting on the part of the clinician. The graphical longitudinal display system eases the workload on the clinician, and permits measurement, calculation, annotation and reporting to happen automatically during the IVUS procedure itself. Users can immediately see which part of a vessel or artery requires treatment, or which part of a stent requires post dilatation. The graphical longitudinal display system makes it easier for clinicians and other users to compare a pre-treatment vessel/artery and post-treatment vessel/artery (e.g., in a vascular treatment such as a Percutaneous Coronary Intervention or PCI), and provides a horizontal or vertical graphical plot of key measurement(s) from each successively captured IVUS frame. The graphical longitudinal display system also highlights of areas or segments of attention during or after an IVUS pullback, and provides the user an ability to switch in real time between a regular image-based ILD and a measurements-based GILD. The graphical longitudinal display system enables the IVUS system to auto-measure or auto-calculate key metric(s) for every frame of the IVUS pullback, and plot the results. In some embodiments, this calculation and plotting occurs in real time during the measurement procedure. In other embodiments, the GILD is presented after completion of the IVUS pullback recording, when the system has finished the processing of all IVUS frames. The user can activate a toggle or other control to switch back and forth between the image-based ILD and measurements-based GILD. The GILD is automatically updated when users edit any of the measurements on which the GILD is based.

These descriptions are provided for exemplary purposes only, and should not be considered to limit the scope of the graphical longitudinal display system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a diagrammatic schematic view of an intraluminal imaging system incorporating the graphical longitudinal display system, according to aspects of the present disclosure. The intraluminal imaging system 100 can be an intravascular ultrasound (IVUS) imaging system in some embodiments. The intraluminal imaging system 100 may include an intraluminal device 102, a patient interface module (PIM) 104, a console or processing system 106, a monitor 108, and an external imaging system 132 which may include angiography, ultrasound, X-ray, computed tomography (CT), magnetic resonance imaging (MRI), or other imaging technologies, equipment, and methods. The intraluminal device 102 is sized and shaped, and/or otherwise structurally arranged to be positioned within a body lumen of a patient. For example, the intraluminal device 102 can be a catheter, guide wire, guide catheter, pressure wire, and/or flow wire in various embodiments. In some circumstances, the system 100 may include additional elements and/or may be implemented without one or more of the elements illustrated in FIG. 1. For example, the system 100 may omit the external imaging system 132.

The intraluminal imaging system 100 (or intravascular imaging system) can be any type of imaging system suitable for use in the lumens or vasculature of a patient. In some embodiments, the intraluminal imaging system 100 is an intraluminal ultrasound (IVUS) imaging system. In other embodiments, the intraluminal imaging system 100 may include systems configured for forward looking intraluminal ultrasound (FL-IVUS) imaging, intraluminal photoacoustic (IVPA) imaging, intracardiac echocardiography (ICE), transesophageal echocardiography (TEE), and/or other suitable imaging modalities.

It is understood that the system 100 and/or device 102 can be configured to obtain any suitable intraluminal imaging data. In some embodiments, the device 102 may include an imaging component of any suitable imaging modality, such as optical imaging, optical coherence tomography (OCT), etc. In some embodiments, the device 102 may include any suitable non-imaging component, including a pressure sensor, a flow sensor, a temperature sensor, an optical fiber, a reflector, a mirror, a prism, an ablation element, a radio frequency (RF) electrode, a conductor, or combinations thereof. Generally, the device 102 can include an imaging element to obtain intraluminal imaging data associated with the lumen 120. The device 102 may be sized and shaped (and/or configured) for insertion into a vessel or lumen 120 of the patient.

The system 100 may be deployed in a catheterization laboratory having a control room. The processing system 106 may be located in the control room. Optionally, the processing system 106 may be located elsewhere, such as in the catheterization laboratory itself. The catheterization laboratory may include a sterile field while its associated control room may or may not be sterile depending on the procedure to be performed and/or on the health care facility. The catheterization laboratory and control room may be used to perform any number of medical imaging procedures such as angiography, fluoroscopy, CT, IVUS, virtual histology (VH), forward looking IVUS (FL-IVUS), intraluminal photoacoustic (IVPA) imaging, a fractional flow reserve (FFR) determination, a coronary flow reserve (CFR) determination, optical coherence tomography (OCT), computed tomography, intracardiac echocardiography (ICE), forward-looking ICE (FLICE), intraluminal palpography, transesophageal ultrasound, fluoroscopy, and other medical imaging modalities, or combinations thereof. In some embodiments, device 102 may be controlled from a remote location such as the control room, such than an operator is not required to be in close proximity to the patient.

The intraluminal device 102, PIM 104, monitor 108, and external imaging system 132 may be communicatively coupled directly or indirectly to the processing system 106. These elements may be communicatively coupled to the medical processing system 106 via a wired connection such as a standard copper link or a fiber optic link and/or via wireless connections using IEEE 802.11 Wi-Fi standards, Ultra Wide-Band (UWB) standards, wireless FireWire, wireless USB, or another high-speed wireless networking standard. The processing system 106 may be communicatively coupled to one or more data networks, e.g., a TCP/IP-based local area network (LAN). In other embodiments, different protocols may be utilized such as Synchronous Optical Networking (SONET). In some cases, the processing system 106 may be communicatively coupled to a wide area network (WAN). The processing system 106 may utilize network connectivity to access various resources. For example, the processing system 106 may communicate with a Digital Imaging and Communications in Medicine (DICOM) system, a Picture Archiving and Communication System (PACS), and/or a Hospital Information System (HIS) via a network connection.

At a high level, an ultrasound imaging intraluminal device 102 emits ultrasonic energy from a transducer array 124 included in scanner assembly 110 mounted near a distal end of the intraluminal device 102. The ultrasonic energy is reflected by tissue structures in the medium (such as a lumen 120) surrounding the scanner assembly 110, and the ultrasound echo signals are received by the transducer array 124. The scanner assembly 110 generates electrical signal(s) representative of the ultrasound echoes. The scanner assembly 110 can include one or more single ultrasound transducers and/or a transducer array 124 in any suitable configuration, such as a planar array, a curved array, a circumferential array, an annular array, etc. For example, the scanner assembly 110 can be a one-dimensional array or a two-dimensional array in some instances. In some instances, the scanner assembly 110 can be a rotational ultrasound device. The active area of the scanner assembly 110 can include one or more transducer materials and/or one or more segments of ultrasound elements (e.g., one or more rows, one or more columns, and/or one or more orientations) that can be uniformly or independently controlled and activated. The active area of the scanner assembly 110 can be patterned or structured in various basic or complex geometries. The scanner assembly 110 can be disposed in a side-looking orientation (e.g., ultrasonic energy emitted perpendicular and/or orthogonal to the longitudinal axis of the intraluminal device 102) and/or a forward-looking looking orientation (e.g., ultrasonic energy emitted parallel to and/or along the longitudinal axis). In some instances, the scanner assembly 110 is structurally arranged to emit and/or receive ultrasonic energy at an oblique angle relative to the longitudinal axis, in a proximal or distal direction. In some embodiments, ultrasonic energy emission can be electronically steered by selective triggering of one or more transducer elements of the scanner assembly 110.

The ultrasound transducer(s) of the scanner assembly 110 can be a piezoelectric micromachined ultrasound transducer (PMUT), capacitive micromachined ultrasonic transducer (CMUT), single crystal, lead zirconate titanate (PZT), PZT composite, other suitable transducer type, and/or combinations thereof. In an embodiment the ultrasound transducer array 124 can include any suitable number of individual transducer elements or acoustic elements between 1 acoustic element and 1000 acoustic elements, including values such as 2 acoustic elements, 4 acoustic elements, 36 acoustic elements, 64 acoustic elements, 128 acoustic elements, 500 acoustic elements, 812 acoustic elements, and/or other values both larger and smaller.

The PIM 104 transfers the received echo signals to the processing system 106 where the ultrasound image (including the flow information) is reconstructed and displayed on the monitor 108. The console or processing system 106 can include a processor and a memory. The processing system 106 may be operable to facilitate the features of the intraluminal imaging system 100 described herein. For example, the processor can execute computer readable instructions stored on the non-transitory tangible computer readable medium.

The PIM 104 facilitates communication of signals between the processing system 106 and the scanner assembly 110 included in the intraluminal device 102. This communication may include providing commands to integrated circuit controller chip(s) within the intraluminal device 102, selecting particular element(s) on the transducer array 124 to be used for transmit and receive, providing the transmit trigger signals to the integrated circuit controller chip(s) to activate the transmitter circuitry to generate an electrical pulse to excite the selected transducer array element(s), and/or accepting amplified echo signals received from the selected transducer array element(s) via amplifiers included on the integrated circuit controller chip(s). In some embodiments, the PIM 104 performs preliminary processing of the echo data prior to relaying the data to the processing system 106. In examples of such embodiments, the PIM 104 performs amplification, filtering, and/or aggregating of the data. In an embodiment, the PIM 104 also supplies high- and low-voltage DC power to support operation of the intraluminal device 102 including circuitry within the scanner assembly 110.

The processing system 106 receives echo data from the scanner assembly 110 by way of the PIM 104 and processes the data to reconstruct an image of the tissue structures in the medium surrounding the scanner assembly 110. Generally, the device 102 can be utilized within any suitable anatomy and/or body lumen of the patient. The processing system 106 outputs image data such that an image of the vessel or lumen 120, such as a cross-sectional IVUS image of the lumen 120, is displayed on the monitor 108. Lumen 120 may represent fluid filled or fluid-surrounded structures, both natural and man-made. Lumen 120 may be within a body of a patient. Lumen 120 may be a blood vessel, such as an artery or a vein of a patient's vascular system, including cardiac vasculature, peripheral vasculature, neural vasculature, renal vasculature, and/or or any other suitable lumen inside the body. For example, the device 102 may be used to examine any number of anatomical locations and tissue types, including without limitation, organs including the liver, heart, kidneys, gall bladder, pancreas, lungs; ducts; intestines; nervous system structures including the brain, dural sac, spinal cord and peripheral nerves; the urinary tract; as well as valves within the blood, chambers or other parts of the heart, and/or other systems of the body. In addition to natural structures, the device 102 may be used to examine man-made structures such as, but without limitation, heart valves, stents, shunts, filters and other devices.

The controller or processing system 106 may include a processing circuit having one or more processors in communication with memory and/or other suitable tangible computer readable storage media. The controller or processing system 106 may be configured to carry out one or more aspects of the present disclosure. In some embodiments, the processing system 106 and the monitor 108 are separate components. In other embodiments, the processing system 106 and the monitor 108 are integrated in a single component. For example, the system 100 can include a touch screen device, including a housing having a touch screen display and a processor. The system 100 can include any suitable input device, such as a touch sensitive pad or touch screen display, keyboard/mouse, joystick, button, etc., for a user to select options shown on the monitor 108. The processing system 106, the monitor 108, the input device, and/or combinations thereof can be referenced as a controller of the system 100. The controller can be in communication with the device 102, the PIM 104, the processing system 106, the monitor 108, the input device, and/or other components of the system 100.

In some embodiments, the intraluminal device 102 includes some features similar to traditional solid-state IVUS catheters, such as the EagleEye® catheter available from Volcano Corporation and those disclosed in U.S. Pat. No. 7,846,101 hereby incorporated by reference in its entirety. For example, the intraluminal device 102 may include the scanner assembly 110 near a distal end of the intraluminal device 102 and a transmission line bundle 112 extending along the longitudinal body of the intraluminal device 102. The cable or transmission line bundle 112 can include a plurality of conductors, including one, two, three, four, five, six, seven, or more conductors.

The transmission line bundle 112 terminates in a PIM connector 114 at a proximal end of the intraluminal device 102. The PIM connector 114 electrically couples the transmission line bundle 112 to the PIM 104 and physically couples the intraluminal device 102 to the PIM 104. In an embodiment, the intraluminal device 102 further includes a guidewire exit port 116. Accordingly, in some instances the intraluminal device 102 is a rapid-exchange catheter. The guidewire exit port 116 allows a guidewire 118 to be inserted towards the distal end in order to direct the intraluminal device 102 through the lumen 120.

The monitor 108 may be a display device such as a computer monitor or other type of screen. The monitor 108 may be used to display selectable prompts, instructions, and visualizations of imaging data to a user. In some embodiments, the monitor 108 may be used to provide a procedure-specific workflow to a user to complete an intraluminal imaging procedure. This workflow may include performing a pre-stent plan to determine the state of a lumen and potential for a stent, as well as a post-stent inspection to determine the status of a stent that has been positioned in a lumen. The workflow may be presented to a user as any of the displays or visualizations shown in FIGS. 5-11.

The external imaging system 132 can be configured to obtain x-ray, radiographic, angiographic/venographic (e.g., with contrast), and/or fluoroscopic (e.g., without contrast) images of the body of patient (including the vessel 120). External imaging system 132 may also be configured to obtain computed tomography images of the body of patient (including the vessel 120). The external imaging system 132 may include an external ultrasound probe configured to obtain ultrasound images of the body of the patient (including the vessel 120) while positioned outside the body. In some embodiments, the system 100 includes other imaging modality systems (e.g., MRI) to obtain images of the body of the patient (including the vessel 120). The processing system 106 can utilize the images of the body of the patient in conjunction with the intraluminal images obtained by the intraluminal device 102.

Figure 2:
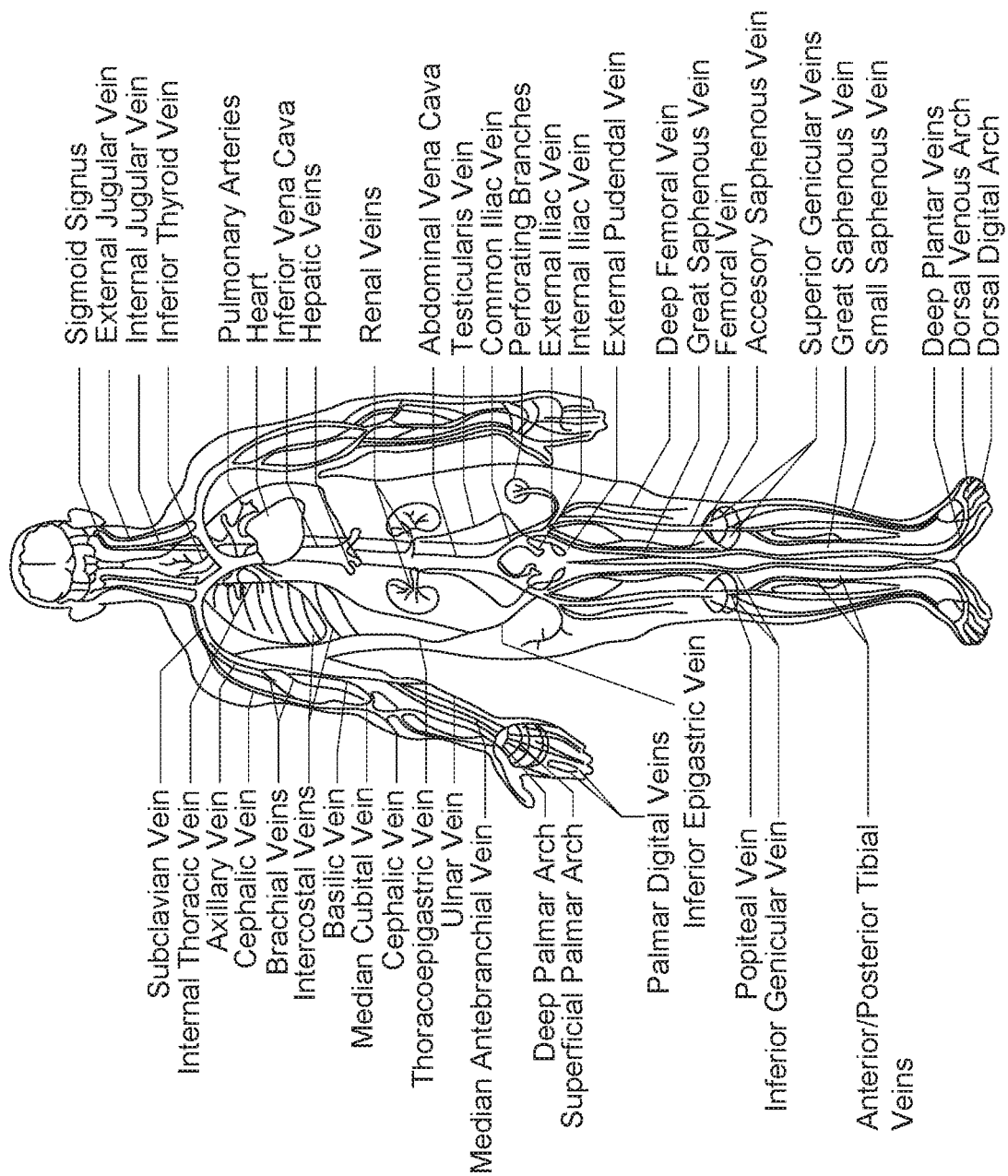
FIG. 2 illustrates blood vessels (e.g., arteries and veins) in the human body.

FIG. 2 illustrates blood vessels (e.g., arteries and veins) in the human body. For example, veins of the human body are labeled. Aspects of the present disclosure can be related to peripheral vasculature, e.g., veins in the torso or legs.

Occlusions can occur in arteries or veins. An occlusion can be generally representative of any blockage or other structural arrangement that results in a restriction to the flow of fluid through the lumen (e.g., an artery or a vein), for example, in a manner that is deleterious to the health of the patient. For example, the occlusion narrows the lumen such that the cross-sectional area of the lumen and/or the available space for fluid to flow through the lumen is decreased. Where the anatomy is a blood vessel, the occlusion may be a result of narrowing due to compression (e.g., from external blood vessels), plaque buildup, including without limitation plaque components such as fibrous, fibro-lipidic (fibro fatty), necrotic core, calcified (dense calcium), and/or different stages of thrombus (e.g., acute, sub acute, chronic, etc.). In some instances, the occlusion can be referenced as thrombus, a stenosis, and/or a lesion. Generally, the composition of the occlusion will depend on the type of anatomy being evaluated. Healthier portions of the anatomy may have a uniform or symmetrical profile (e.g., a cylindrical profile with a circular cross-sectional profile). The occlusion may not have a uniform or symmetrical profile. Accordingly, diseased or compressed portions of the anatomy, with the occlusion, will have a non-symmetric and/or otherwise irregular profile. The anatomy can have one occlusion or multiple occlusions.

Build-up of occlusion (e.g., thrombus, deep vein thrombosis or DVT, chronic total occlusion or CTO, etc.) is one way in which the cross-sectional area of the vein in the peripheral vasculature (e.g., torso, abdomen, groin, leg) may be reduced. Other anatomy that contacts the vein can also reduce its cross-sectional area, thereby restricting blood flow therethrough. For example, arteries or ligaments in the torso, abdomen, groin, or leg can press against a vein, which changes the shape of the vein and reduces its cross-sectional area. Such reductions in cross-sectional area resulting from contact with other anatomy can be referenced as compression, in that the walls of the vein are compressed as a result of the contact with the artery or ligament.

Figure 3:
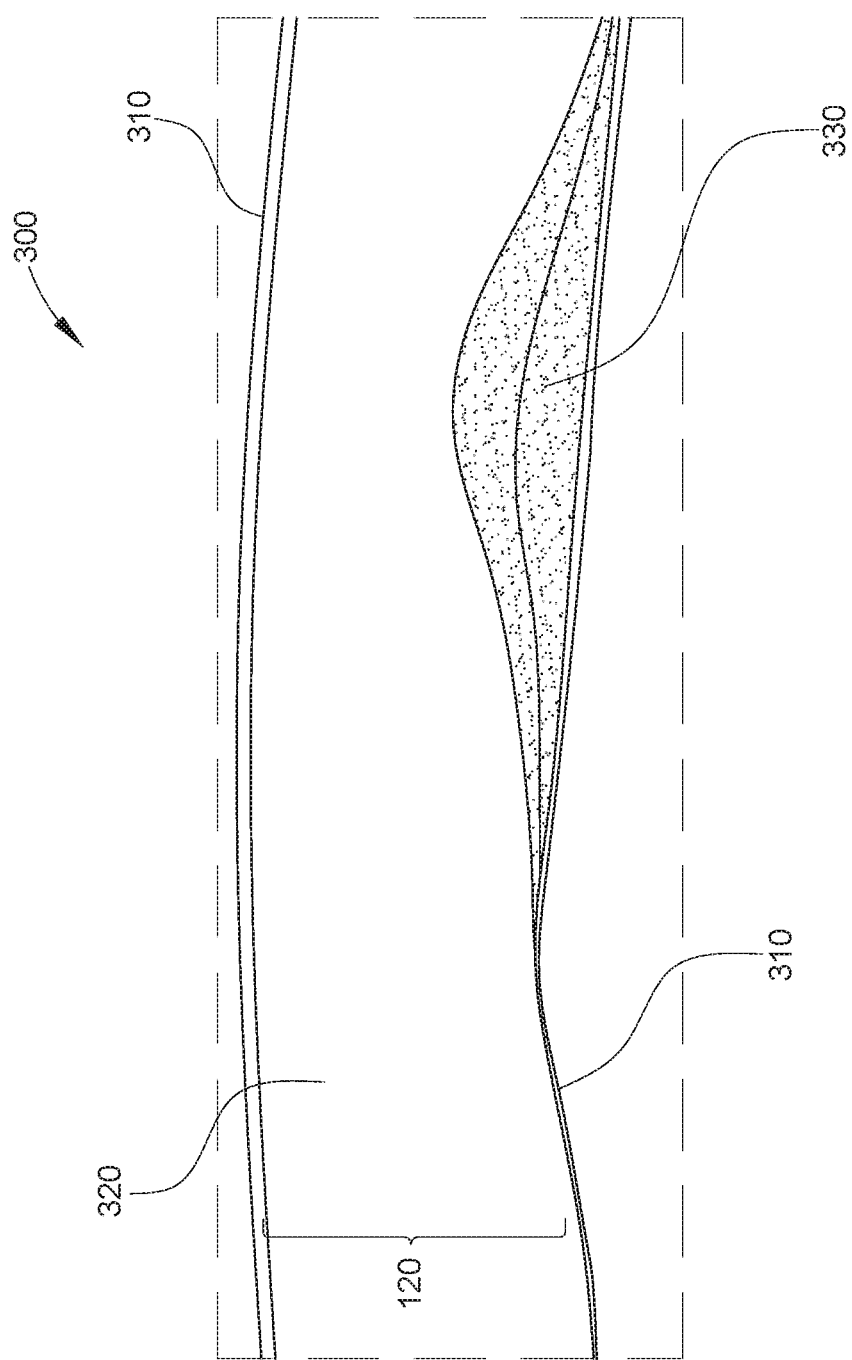
FIG. 3 illustrates a blood vessel incorporating a compression.

FIG. 3 illustrates a blood vessel 300 incorporating a compression 330. The compression 330 occurs outside the vessel walls 310 and may restrict the flow of blood 320. The compression may be caused by other anatomical structures outside the blood vessel 300, including but not limited to a tendon, ligament, or neighboring lumen.

Figure 4:
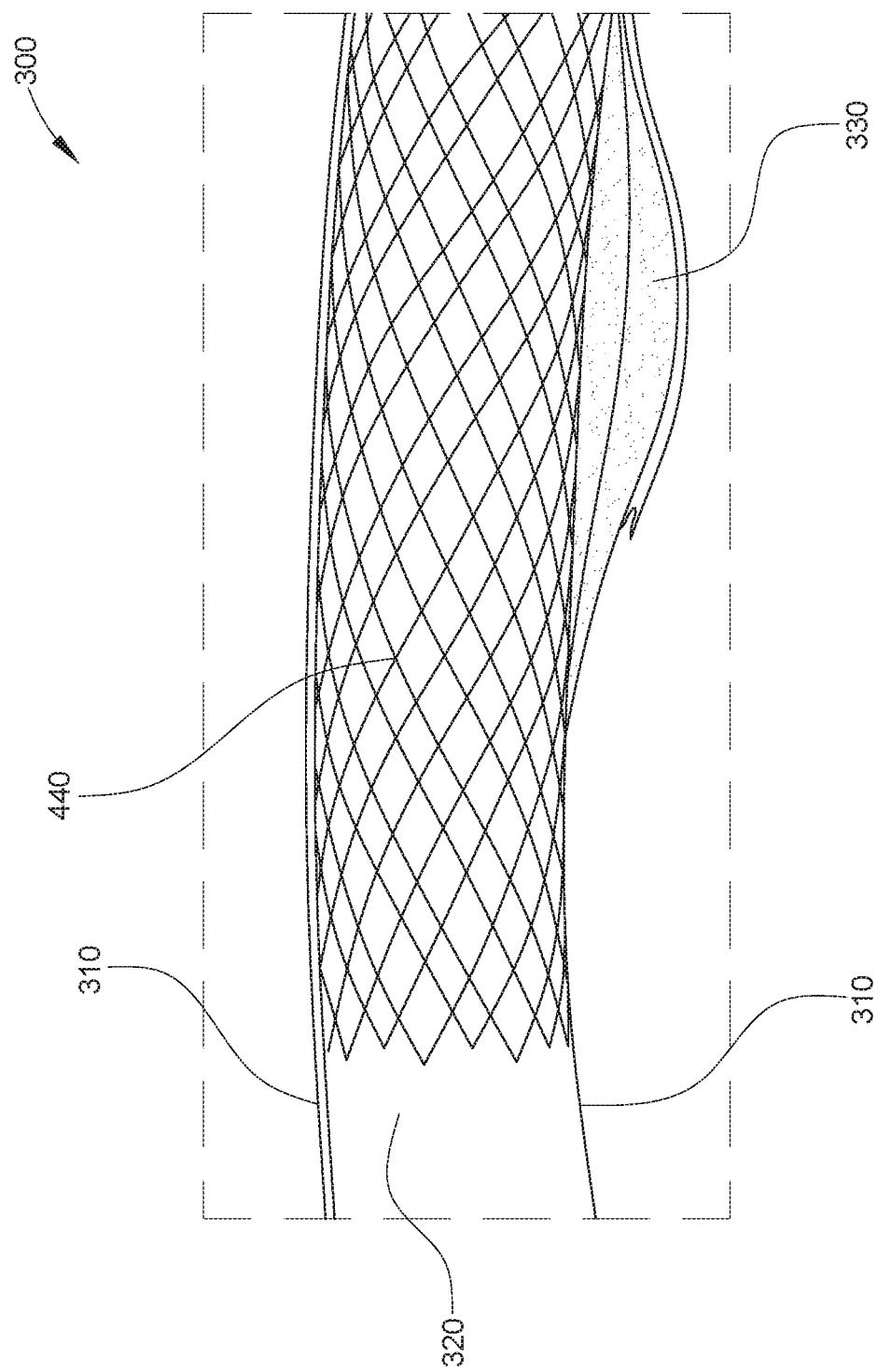
FIG. 4 illustrates a blood vessel incorporating a compression and with a stent expanded within it to restore flow.

FIG. 4 illustrates a blood vessel 300 incorporating a compression 330 and with a stent 440 expanded within it to restore flow. The stent 440 displaces and arrests the compression 330, pushing the vessel walls 310 outward, thus reducing the flow restriction for the blood 320. Other treatment options for alleviating an occlusion may include but are not limited to thrombectomy, ablation, angioplasty, and pharmaceuticals. However, in a large majority of cases it may be highly desirable to obtain accurate and timely intravascular images of the affected area, along with accurate and detailed knowledge of the location, orientation, length, and volume of the affected area prior to, during, or after treatment.

Figure 5:
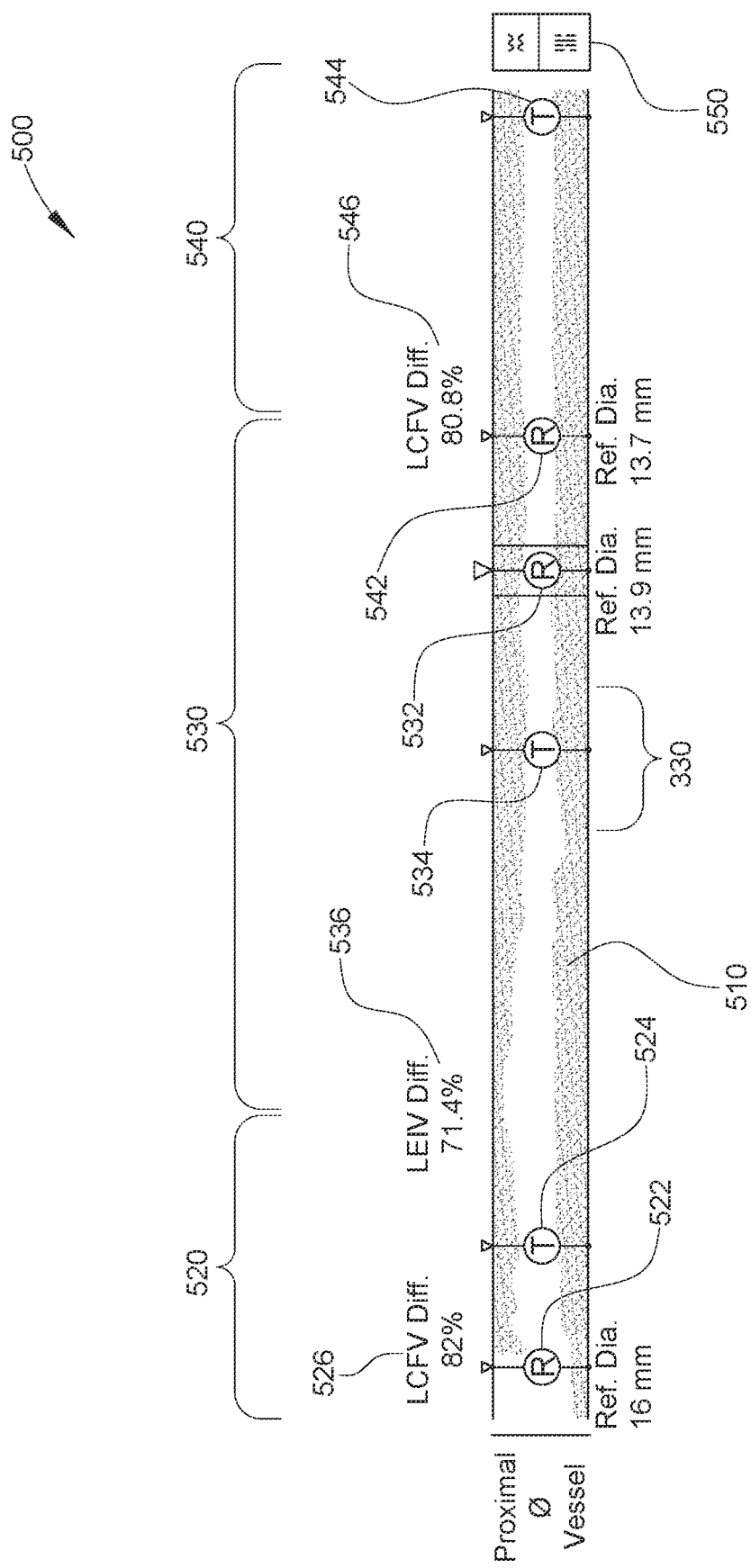
FIG. 5 shows a screen display of an exemplary Image Longitudinal Display following a pullback procedure in a leg vein of a patient.

FIG. 5 shows a screen display 500 of an exemplary horizontal ILD (In-Line Digital or Image Longitudinal Display) 510 following a pullback procedure in a leg vein of a patient. The ILD 510 comprises a stacked arrangement of tomographic images or cross-sectional views of the tomographic images. In this example, the view is divided into three different segments: the common iliac vein (CIV) 520, the external iliac vein (EIV) 530, and common femoral vein (CFV) 540. Other vessel segments or lumen segments may be identified in other areas of the body. In some embodiments, the identification of vessel segments is performed automatically by the graphical longitudinal display system. In other embodiments, the identification of vessel segments is performed manually by a clinician or other user.

In this example, within the CIV 520, a reference marker or reference handle 522 identifies a tomographic section representative of healthy tissue. This may, for example, be the widest part of the vessel segment 520. Similarly, a target marker or target handle 524 identifies a tomographic section (e.g., a frame or image) of interest. This may, for example, be the narrowest part of the vessel segment 520. A difference calculation 526 shows the relative diameter or cross-sectional area of the target area 524 as compared with the reference area 522. This may be expressed as a percentage, a fraction or ratio, a pie chart, or any other means of representing fractional or relative values. The EIV segment 530 contains a reference marker 532, target marker 534, and difference calculation 536, and the CFV segment 540 contains a reference marker 542, target marker 544, and difference calculation 546. Some embodiments may include a larger or smaller number of vessel segments, each with its own reference marker, target marker, and difference calculation. In some embodiments, other quantitative information or automatic measurements may also be shown proximate to the identified segment.

In some embodiments, the locations of the reference markers 522, 532, and 542 and target markers 524, 534, and 544 are selected automatically by the graphical longitudinal display system. In other embodiments, the locations of the reference markers and target markers are virtual "handles" that can be moved by the user to desired locations. In this example, target marker 534 corresponds to a constriction 330 in the vessel 510. A mode selector 550 permits the user to initiate a change of image type, by selecting between an image longitudinal display 510 and a graphical longitudinal display, as described below. In the example of FIG. 5, the image longitudinal display option is selected.

Figure 6:
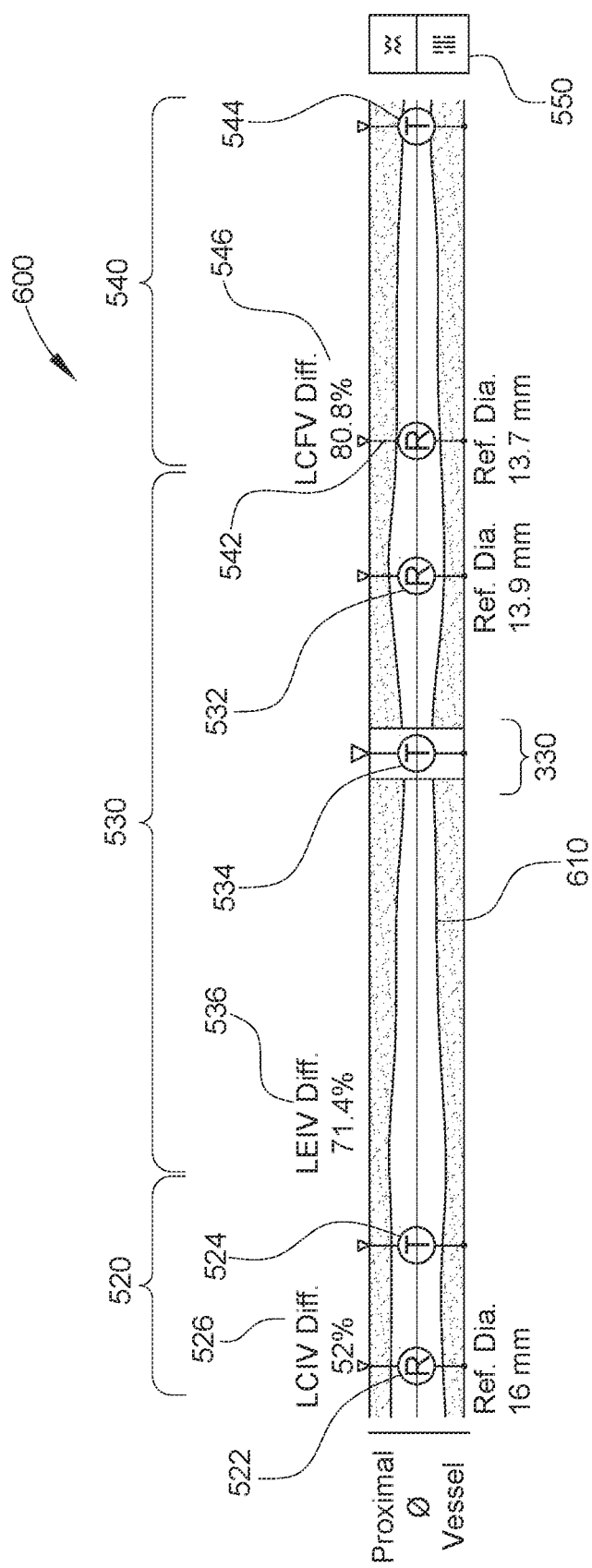
FIG. 6 shows a screen display of an exemplary graphical longitudinal display following a pre-treatment pullback procedure in a leg vein of a patient, in accordance with at least one embodiment of the present disclosure.

FIG. 6 shows a screen display 600 of an exemplary graphical longitudinal display 610 following a pre-treatment pullback procedure in a leg vein of a patient, in accordance with at least one embodiment of the present disclosure. As with the example in FIG. 5, the view is divided into three different segments: the CIV 520, EIV 530, and CFV 540, with respective reference markers 522. 532, and 542, target markers 524, 534, and 544, and difference calculations 526, 536, and 546. The graphical longitudinal display or GILD 610 shows the same information as the image longitudinal display 510, but in a stylized graphical format wherein the vessel or lumen is depicted as symmetrical about a horizontal centerline, and the height or diameter of the GILD 610 at any given point is representative of either a diameter of the vessel at a corresponding point for a given cross-sectional angle, or else an average of two or more diameters for that point for two or more cross-sectional angles, or else the cross-sectional area of the vessel at that corresponding point. Visual clutter, ultrasound noise, asymmetries and irregularities in the shape of the vessel are not represented in the GILD 610. Thus, the location and severity of a constriction 330 is more readily apparent in this view than in FIG. 5.

In some embodiments, the GILD 610 comprises a smoothed lumen boundary derived from the actual, anatomical contours of the lumen border as captured in the successive tomographic IVUS images. In other embodiments, the smoothed lumen boundary can be an illustration of a measured or computed quantity (e.g., lumen diameter or cross-sectional area).

In this example, no branching or neighboring lumens or anatomical structures are shown, so as to maximize the at-a-glance comprehensibility of the graphical longitudinal display. In other embodiments, some branching or neighboring structures may be shown, in order to maximize the location awareness of the clinician or other user. A mode selector 550 permits the user to select between an image longitudinal display 510 and a graphical longitudinal display 610. In the example of FIG. 6, the graphical longitudinal display option is selected, and so the GILD 610 is displayed in place of the ILD 510.

In some embodiments, the ILD 510 and GILD 610, or portions thereof, may be displayed simultaneously. Stylized can include a figure, diagram, drawing, or graphic that is stored in and retrieved from memory (e.g., common for all patients or representative of all patients), or that is generated from data obtained from one or more IVUS images, and is different than an actual image obtained by an imaging device (e.g., x-ray or IVUS).

Figure 7:
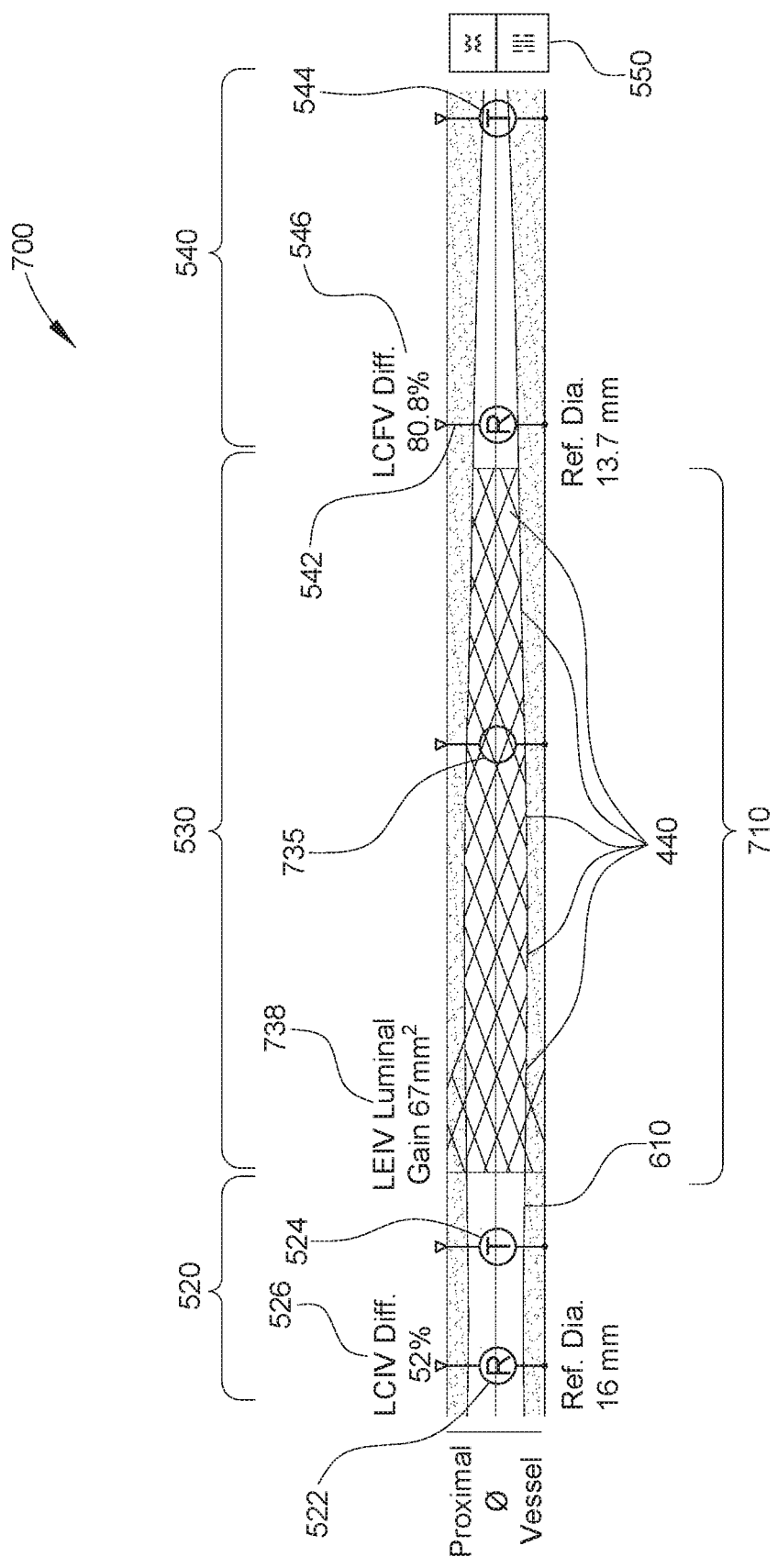
FIG. 7 shows a screen display of an exemplary graphical longitudinal display following a post-treatment pullback procedure in a leg vein of a patient, in accordance with at least one embodiment of the present disclosure.

FIG. 7 shows a screen display 700 of an exemplary graphical longitudinal display following a post-treatment pullback procedure in a leg vein of a patient, in accordance with at least one embodiment of the present disclosure. As with the example in FIGS. 5 and 6, the view is divided into three different segments: the CIV 520, EIV 530, and CFV 540, with respective reference markers 522 and 542, target markers 524 and 544, and difference calculations 526 and 546. However, the EIV segment 530 now includes a number of stents 440, which are detected automatically by the system and included on the GILD 610, thus defining a post-treatment area 710. As a consequence, the reference marker 532 and target marker 534 have been replaced with a post-treatment location marker 735. In an example, the post-treatment marker 735 is in the same location previously occupied by the target marker 534. Similarly, the difference calculation 536 has been replaced with a post-treatment gain calculation 738, which describes the difference between the pre-treatment and post-treatment diameter or area at the corresponding point in the vessel. This difference may be expressed as a distance (e.g., in millimeters), an area (e.g., in $mm^2$), a percent improvement, a pie or bar chart, or other means that depict the improvement in numerical or graphical terms. Thus, a clinician or other user can examine the GILD 610 and, at a glance, gain an immediate sense of how successful the treatment has been, whether a stent requires post dilation, whether additional stents are required, etc.

A mode selector 550 permits the user to select between an image longitudinal display 510 and a graphical longitudinal display 610. In the example of FIG. 7, the graphical longitudinal display option is selected.

Examples of border detection, image processing, image analysis, and/or pattern recognition include U.S. Pat. No. 6,200,268 entitled "VASCULAR PLAQUE CHARACTERIZATION" issued Mar. 13, 2001 with D. Geoffrey Vince, Barry D. Kuban and Anuja Nair as inventors, U.S. Pat. No. 6,381,350 entitled "INTRAVASCULAR ULTRASONIC ANALYSIS USING ACTIVE CONTOUR METHOD AND SYSTEM" issued Apr. 30, 2002 with Jon D. Klingensmith, D. Geoffrey Vince and Raj Shekhar as inventors, U.S. Pat. No. 7,074,188 entitled "SYSTEM AND METHOD OF CHARACTERIZING VASCULAR TISSUE" issued Jul. 11, 2006 with Anuja Nair, D. Geoffrey Vince, Jon D. Klingensmith and Barry D. Kuban as inventors, U.S. Pat. No. 7,175,597 entitled "NON-INVASIVE TISSUE CHARACTERIZATION SYSTEM AND METHOD" issued Feb. 13, 2007 with D. Geoffrey Vince, Anuja Nair and Jon D. Klingensmith as inventors, U.S. Pat. No. 7,215,802 entitled "SYSTEM AND METHOD FOR VASCULAR BORDER DETECTION" issued May 8, 2007 with Jon D. Klingensmith, Anuja Nair, Barry D. Kuban and D. Geoffrey Vince as inventors, U.S. Pat. No. 7,359,554 entitled "SYSTEM AND METHOD FOR IDENTIFYING A VASCULAR BORDER" issued Apr. 15, 2008 with Jon D. Klingensmith, D. Geoffrey Vince, Anuja Nair and Barry D. Kuban as inventors and U.S. Pat. No. 7,463,759 entitled "SYSTEM AND METHOD FOR VASCULAR BORDER DETECTION" issued Dec. 9, 2008 with Jon D. Klingensmith, Anuja Nair, Barry D. Kuban and D. Geoffrey Vince, as inventors, the teachings of which are hereby incorporated by reference herein in their entirety.

Figure 8:
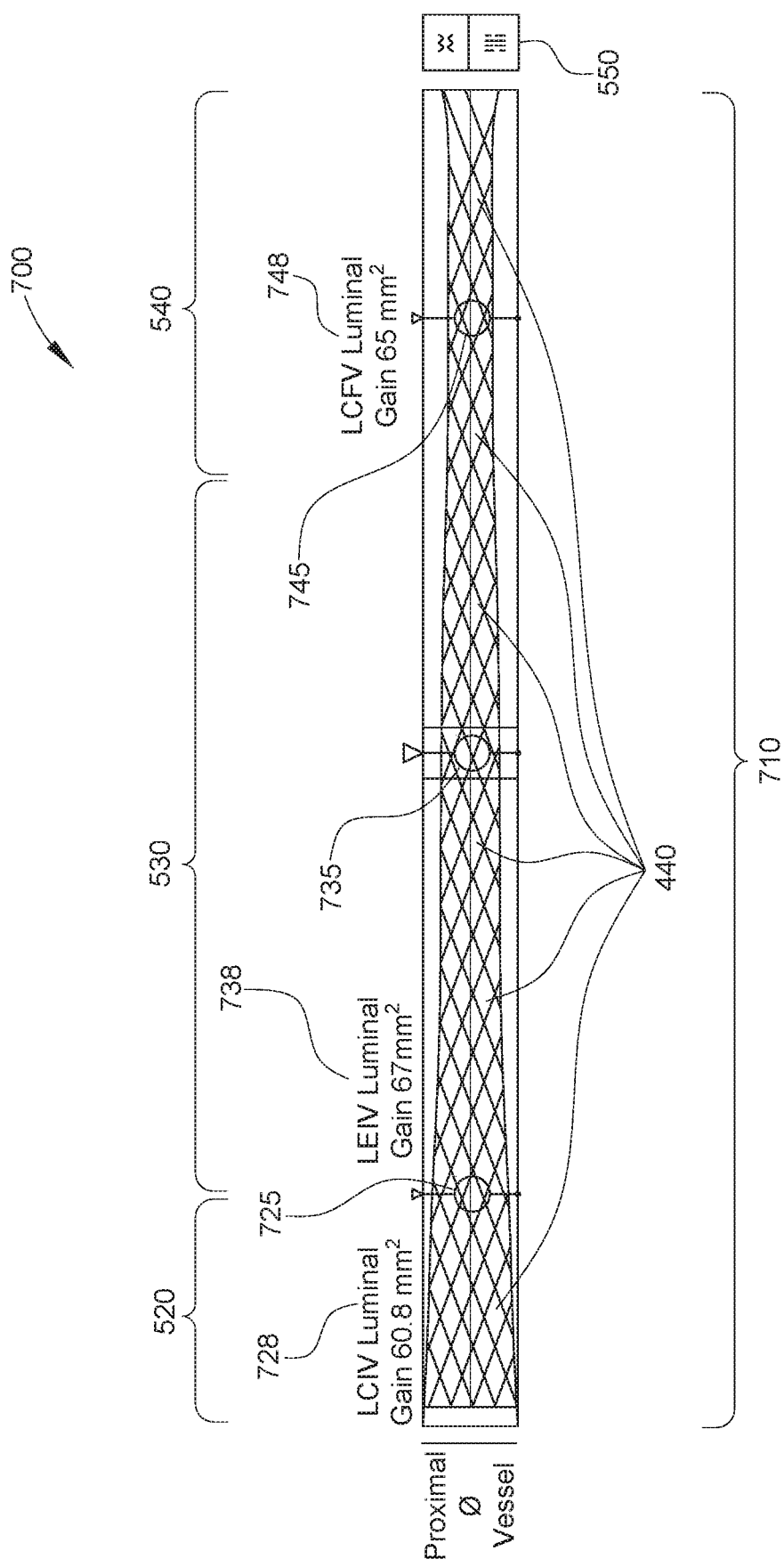
FIG. 8 shows a screen display of an exemplary graphical longitudinal display following a post-treatment pullback procedure in a leg vein of a patient, in accordance with at least one embodiment of the present disclosure.

FIG. 8 shows a screen display of an exemplary graphical longitudinal display following a post-treatment pullback procedure in a leg vein of a patient, in accordance with at least one embodiment of the present disclosure. As with the example in FIGS. 5 and 6, the view is divided into three different segments: the CIV 520, EIV 530, and CFV 540. In this post-treatment example, stents 440 have been placed in all three segments 520, 530, and 540, thus defining a larger post-treatment area 710. As a result, the reference markers 522. 532, and 542, target markers 524, 534, and 544 have all been replaced with post-treatment location markers 725, 735, and 745. The difference calculations 526, 536, and 546 have been replaced with post-treatment improvement calculations 728, 738, and 748.

Figure 9:
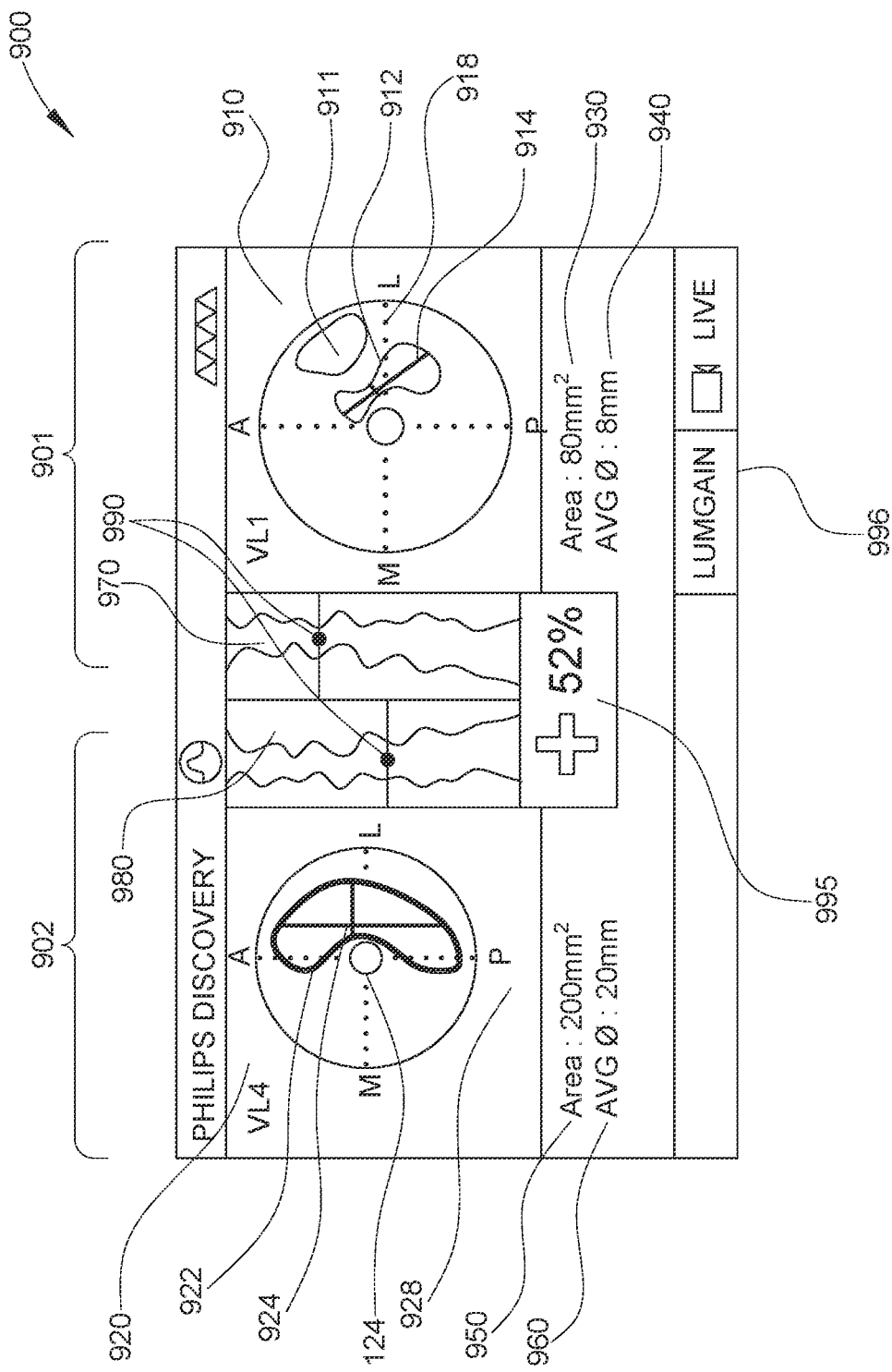
FIG. 9 illustrates a screen display of an exemplary image longitudinal display system incorporating pre-treatment and post-treatment tomographic and longitudinal displays, in accordance with at least one embodiment of the present disclosure.

FIG. 9 illustrates a screen display 900 of an exemplary Image Longitudinal Display (ILD) system incorporating pre-treatment and post-treatment tomographic and longitudinal displays, in accordance with at least one embodiment of the present disclosure. In this example, the right side 901 of the screen display 900 shows a pre-treatment target location of a vessel, and the left side 902 of the screen display 900 shows post-treatment views of the same target location. In an example, the positions of pre-treatment and post-treatment images can be swapped, if desired, such that the pre-treatment images appear on the left, and the post-treatment images appear on the right.

The pre-treatment display 901 includes a tomographic image 910 including an anatomical intrusion 911 (e.g., a bone, tendon, or neighboring vessel) that compresses a vessel 912. Diameter measurement tools 914 show the height and width of the vessel 912. An area calculation 930 shows a computed cross-sectional area (e.g., in $mm^2$) for the vessel at this location, and a diameter calculation 940 shows the average of the height and width measurements 914 for this location. Direction indicators 918 provide orientation cues to tell a clinician or other user the orientation of the tomographic image 910 with respect to the patient's body. In an example, the directions A (anterior, toward the patient's front), P (posterior, toward the patient's rear), M (medial, toward the patient's centerline), and L (lateral, away from the patient's centerline) are indicated, although other direction indicators may be used to convey similar information. The pre-treatment display also includes a vertical image longitudinal display 970, along with a "handle" or position marker 990 indicating which portion of the vessel is represented by the tomographic image 910.

The post treatment display 902 is similar to the pre-treatment display 901, in that it depicts the same location or a nearby or associated location within the vessel in the same format as the pre-treatment display 901. A tomographic image 920 includes an imaging probe 124, a vessel 922 with diameter measuring tools 924, direction indicators 928, a measured or computed cross-sectional area 950, and a measured or computed average diameter 960.

A comparator 995 shows the difference in cross-sectional area between the pre-treatment and post-treatment location. It should be noted that the described use is merely exemplary, and that the same screen display 900 can be used to show a pre-treatment reference location alongside a pre-treatment target location, a pre-treatment reference location alongside a post-treatment reference location, a pre- or post-treatment target location alongside a similar location for a human anatomical reference (e.g., an "average person" or demographically representative patient model). In an example, a clinician or other user can activate a user control (e.g., a touchscreen button 996) to replace the vertical image longitudinal displays with vertical graphical longitudinal displays, as described above but in a vertical rather than a horizontal orientation.

Figure 10:
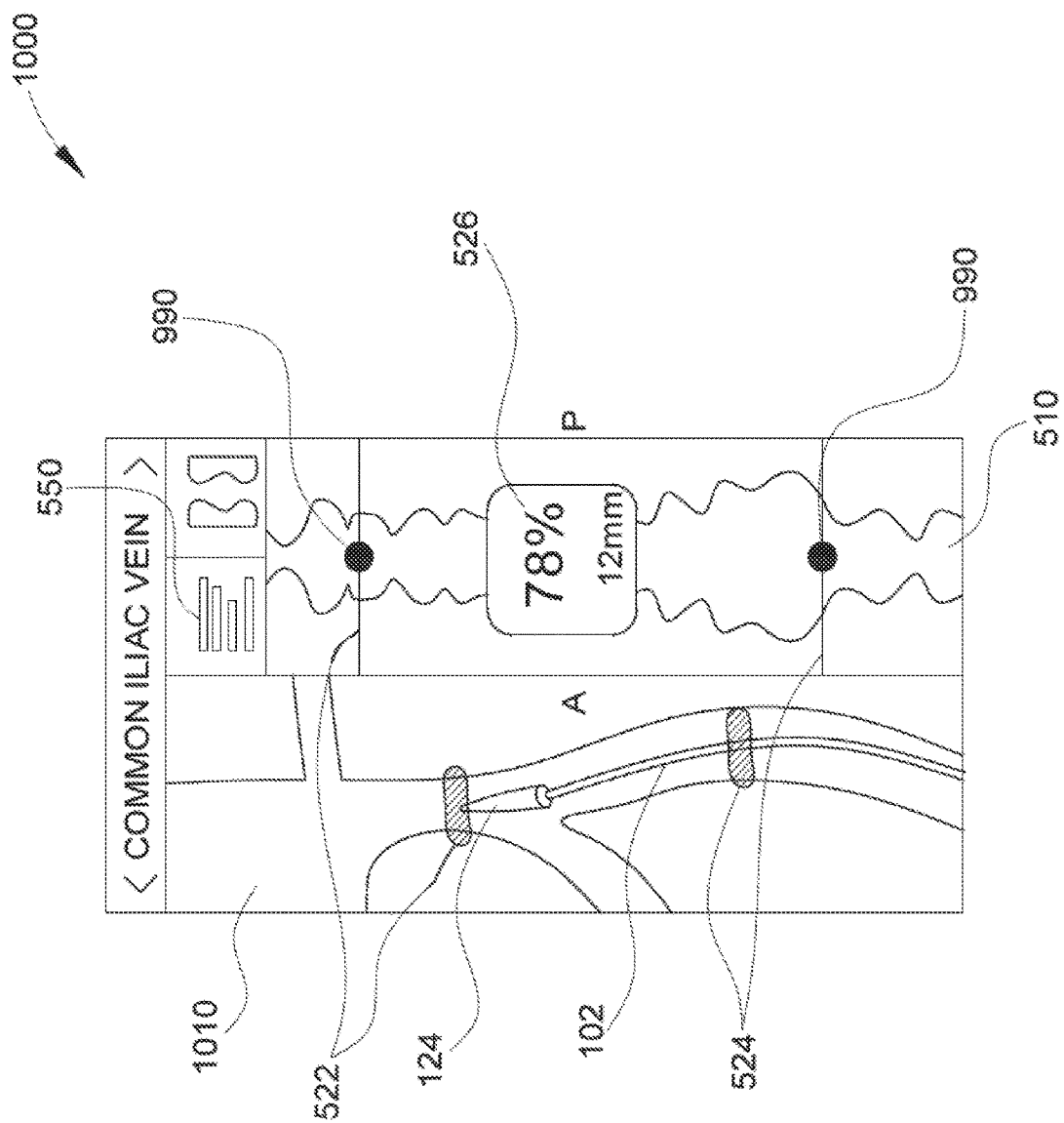
FIG. 10 illustrates a screen display of an exemplary image longitudinal display system incorporating a roadmap image, in accordance with at least one embodiment of the present disclosure.

FIG. 10 illustrates a screen display of an exemplary image longitudinal display system incorporating a roadmap image 1010 and vertical image longitudinal display (ILD) 510, in accordance with at least one embodiment of the present disclosure. A pair of "handles" 990 can be used to select a reference location 522 and a reference location 524 on both the roadmap image and the longitudinal display 510. A mode selector 550 permits the user to select between an image longitudinal display 510 and a graphical longitudinal display, as described above. In the example of FIG. 10, the image longitudinal display option is selected. A comparator 526 shows the computed difference in diameter or area between the target and reference locations. Also visible in the roadmap image 1010 are the catheter 102 and imaging probe 124.

Figure 11:
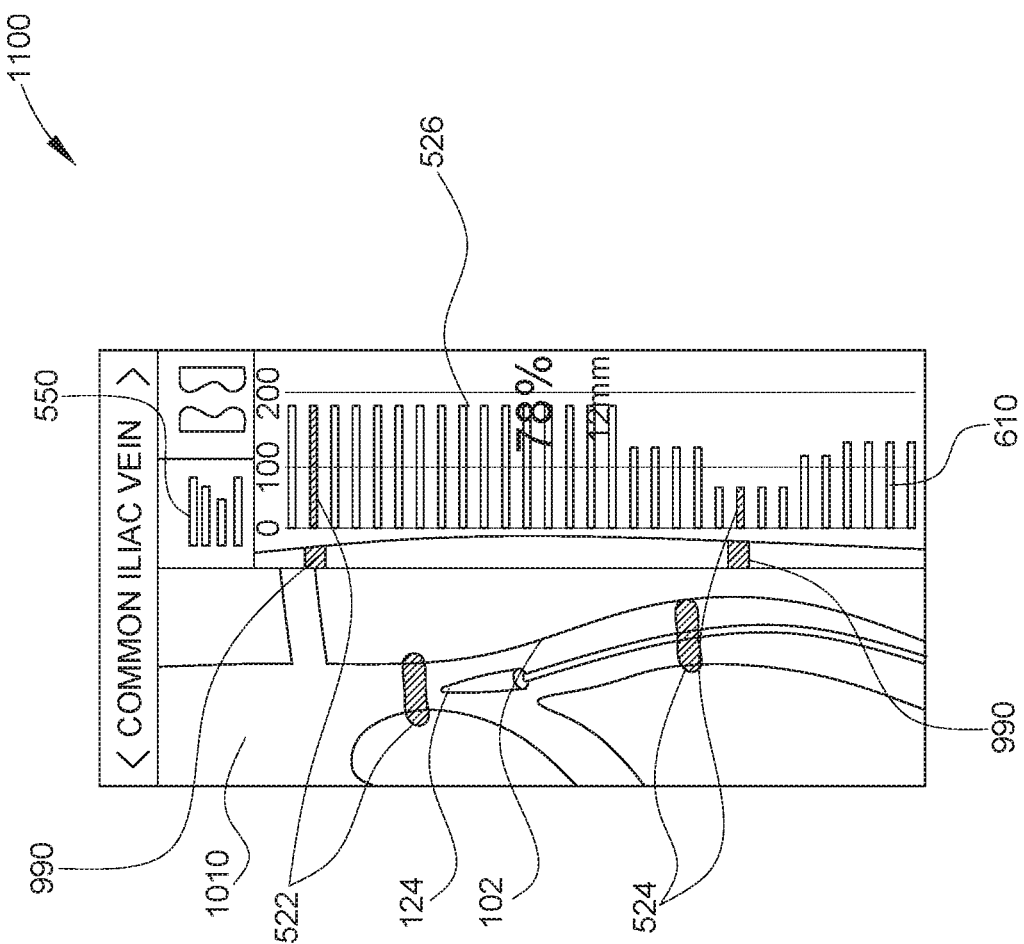
FIG. 11 illustrates a screen display of an exemplary graphical longitudinal display system incorporating a roadmap image, in accordance with at least one embodiment of the present disclosure.

FIG. 11 illustrates a screen display 1100 of an exemplary graphical longitudinal display system incorporating a vertical roadmap image 1010 and vertical graphical longitudinal display or GILD 610, in accordance with at least one embodiment of the present disclosure. As with FIG. 10, pair of handles 990 can be used to select a reference location 522 and a reference location 524 on both the roadmap image and the longitudinal display 610. A mode selector 550 permits the user to select between an image longitudinal display 510 and a graphical longitudinal display, as described above. In the example of FIG. 10, the graphical longitudinal display option is selected. In this example, rather than being symmetric about a centerline (e.g., a vertical axis for a vertical GILD or a horizontal axis for a horizontal GILD), the GILD 610 is "left justified" as a user preference. In addition, as a user preference in this example, the GILD 610 depicts the cross-sectional area of the vessel for each tomographic section, as a percentage of the area of the reference image (e.g., in a range from 0% to 200%). In an example, users may also opt to center or right justify the GILD 610 and to define the measurement units displayed by the GILD 610, depending on user preferences and other visual settings of the display 1000. Similarly, for a horizontal GILD 610, the user may opt to center, top justify, or bottom justify the GILD 610. A comparator 526 shows the computed difference in diameter or area between the target and reference locations. Also visible in the roadmap image 1010 are the catheter 102 and imaging probe 124.

Figure 12:
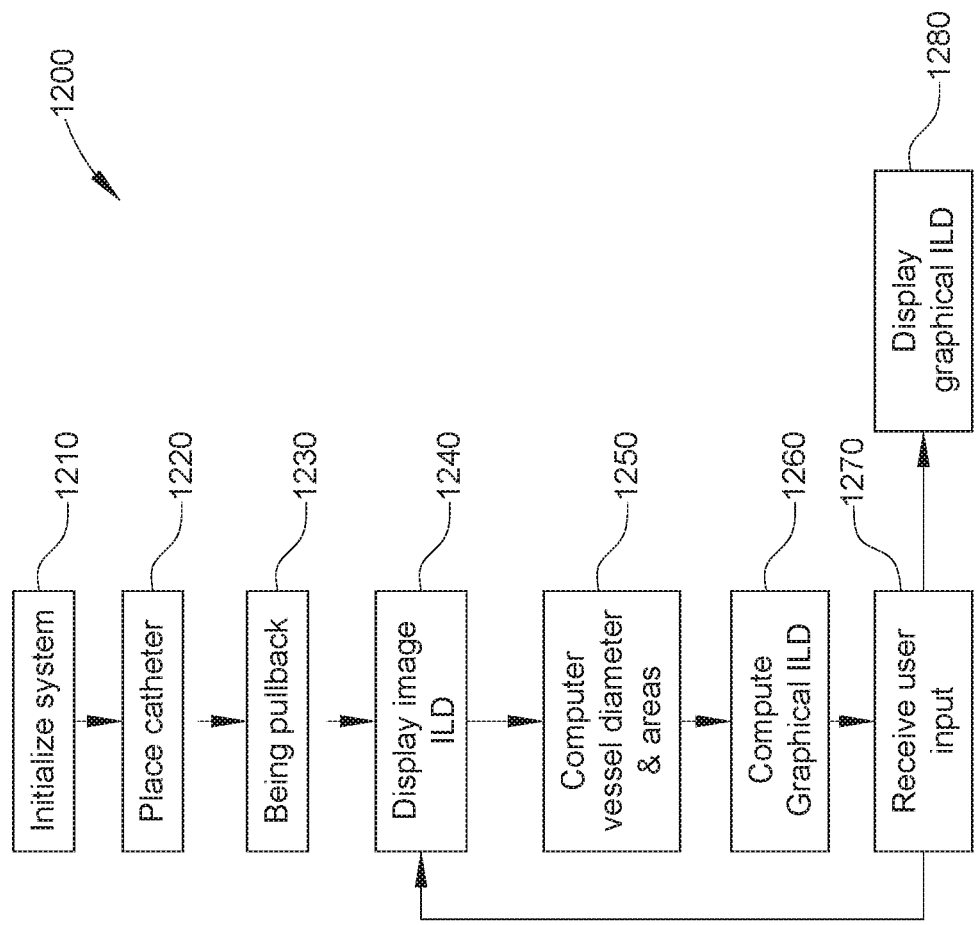
FIG. 12 shows a flow diagram of an exemplary graphical longitudinal display method, in accordance with at least one embodiment of the present disclosure.

FIG. 12 shows a flow diagram of an exemplary graphical longitudinal display method 1200, in accordance with at least one embodiment of the present disclosure. The steps of this process may for example be stored as instructions on a non-volatile medium and executed by a processing system in communication with the imaging probe 124, in response to user inputs that select for different logical branches to be executed.

In step 1210, the method 1200 initializes to a beginning state.

In step 1220, a clinician or other user places the catheter 102 into a vessel of the patient and prepares to implement a pullback, e.g., capturing a sequence of images while physically pulling or pushing the catheter 102 through the vessel in order to image the vessel and assess its condition.

In step 1230, the clinician or other user pulls the catheter through the vessel. Typically, the clinician or other user does this manually, though making an effort to maintain a constant speed and direction during image recording.

In step 1230, the graphical longitudinal display method 1200 executing on the processor begins populating the image longitudinal display (ILD) with tomographic images as they are received, section by section, from the imaging probe.

In step 1240, the graphical longitudinal display method 1200 executing on the processor displays the ILD. This can be done after the pullback is complete and recording has stopped. However, in an example, the ILD is continually refreshed as new tomographic images are captured. It should be noted that this step is optional, as display of an ILD is not a necessary precursor for display of a GILD.

In step 1250, the diameters (e.g., width and height) and/or cross-sectional area of the vessel are computed for each location for which a tomographic image has been captured, based on performing a border detection procedure to identify the lumen boundary, and analyzing the area enclosed within the boundary. This step can be performed manually by a clinician or other user, or may be performed automatically during the pullback, or may be performed automatically once the pullback is complete and recording has stopped. However, in an example, the graphical longitudinal display system executing on the processor performs these steps automatically on each tomographic image as it is captured, stored, and optionally added to the ILD.

In step 1260, the graphical longitudinal display method 1200 executing on the processor performs any additional calculations (e.g., percent improvement or other scoring variables) necessary for the display of the graphical longitudinal display (GILD).

In step 1270, the graphical longitudinal display method 1200 executing on the processor polls for user input indicating that the user may wish to switch between the ILD and GILD displays. If such an input is received, the method either proceeds to step 1280 and displays the GILD, or proceeds to step 1240 and displays the ILD.

Figure 13:
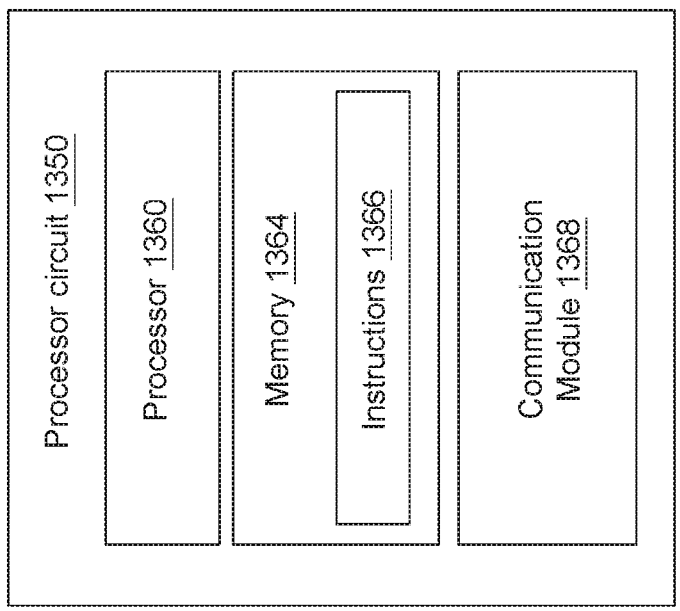
FIG. 13 is a schematic diagram of a processor circuit, according to embodiments of the present disclosure.

FIG. 13 is a schematic diagram of a processor circuit 1350, according to embodiments of the present disclosure. The processor circuit 1350 may be implemented in the ultrasound imaging system 100, or other devices or workstations (e.g., third-party workstations, network routers, etc.), or in a cloud processor or other remote processing unit, as necessary to implement the method. As shown, the processor circuit 1350 may include a processor 1360, a memory 1364, and a communication module 1368. These elements may be in direct or indirect communication with each other, for example via one or more buses.

The processor 1360 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1360 may also comprise another hardware device, a firmware device, or any combination thereof configured to perform the operations described herein. The processor 1360 may also be implemented as a combination of computing devices, e.g., a combination of a DSP and a microprocessor, a plurality of microprocessors, one or more microprocessors in conjunction with a DSP core, or any other such configuration.

The memory 1364 may include a cache memory (e.g., a cache memory of the processor 1360), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1364 includes a non-transitory computer-readable medium. The memory 1364 may store instructions 1366. The instructions 1366 may include instructions that, when executed by the processor 1360, cause the processor 1360 to perform the operations described herein. Instructions 1366 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1368 can include any electronic circuitry and/or logic circuitry to facilitate direct or indirect communication of data between the processor circuit 1350, and other processors or devices. In that regard, the communication module 1368 can be an input/output (I/O) device. In some instances, the communication module 1368 facilitates direct or indirect communication between various elements of the processor circuit 1350 and/or the ultrasound imaging system 100. The communication module 1368 may communicate within the processor circuit 1350 through numerous methods or protocols. Serial communication protocols may include but are not limited to US SPI, I²C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the ultrasound device) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

FIG. 14*a* shows an axial/tomographic cross section 1410 of a lumen 120. This shows or demonstrates the orientation of a tomographic intraluminal image (e.g., tomographic image 910 from FIG. 9) captured by the intraluminal imaging probe 102 within a lumen 120.

FIG. 14*b* shows a longitudinal cross-section 1420 of a lumen 120. This shows or demonstrates the orientation of an image longitudinal display of a lumen (e.g., ILD 510 from FIG. 5) comprising a plurality of longitudinal cross-sections of axial/tomographic images (e.g., tomographic image 910) of the lumen 120. It also demonstrates the orientation of a graphical image longitudinal display (e.g., GILD 610 from FIG. 6) with respect to the lumen 120 that it represents.

A number of variations are possible on the examples and embodiments described above. For example, the graphical longitudinal display system may be employed in anatomical systems within the body other than those described, or may be employed to image other disease types, object types, or procedure types than those described. The technology described herein may be applied to intraluminal imaging sensors of diverse types, whether currently in existence or hereinafter developed.

Accordingly, the logical operations making up the embodiments of the technology described herein are referred to variously as operations, steps, objects, elements, components, or modules. Furthermore, it should be understood that these may be performed in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the graphical longitudinal display system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the graphical longitudinal display system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. An intraluminal ultrasound imaging system, comprising:
   a processor circuit configured for communication with an intraluminal ultrasound imaging catheter, wherein the processor circuit is configured to:
      receive a plurality of intraluminal ultrasound images obtained by the intraluminal ultrasound imaging catheter while the intraluminal ultrasound imaging catheter is moved through a body lumen of a patient, wherein the plurality of intraluminal ultrasound images comprise axial cross-sectional views of the body lumen;
      generate an image-based display of the body lumen using the plurality of intraluminal ultrasound images;
      generate a stylized graphic of the body lumen based on the plurality of intraluminal ultrasound images, wherein the image-based display and the stylized graphic comprise alternative visual depictions of a same view of the body lumen, wherein the same view of the body lumen comprises a longitudinal cross-sectional view of the body lumen;
      output, to a display in communication with the processor circuit, a screen display comprising:
         an area for the longitudinal cross-sectional view of the body lumen; and
         a mode selector configured to permit a user to change a type of display; and receive an individual user input via the mode selector, wherein the area comprises only one of the image-based display or the stylized graphic in response to the individual user input, wherein the mode selector is displayed proximate to the area in the screen display when the area comprises the image-based display and when the area comprises the stylized graphic such that:

the individual user input is configured to switch the area to the image-based display when the area comprises the stylized graphic; and the individual user input is configured to switch the area to the stylized graphic when the area comprises the image-based display, wherein the mode selector is specific to selecting between the image-based display and the stylized graphic such that the mode selector is configured only to switch the area between the alternative visual depictions of the same view of the body lumen.

2. The system of claim 1,
wherein the processor circuit is configured to determine quantitative information representative of the body lumen based on the plurality of intraluminal ultrasound images, and wherein the screen display comprises the quantitative information.

3. The system of claim 1,
wherein the processor circuit is configured to generate a smoothed lumen boundary or smoothed lumen measurement based on the plurality of intraluminal ultrasound images, and
wherein the stylized graphic comprises the smoothed lumen boundary or smoothed lumen measurement.

4. The system of claim 3, wherein the smoothed lumen boundary is symmetrical about a central longitudinal axis of the body lumen in the stylized graphic.

5. The system of claim 1, wherein the processor circuit is further configured to output, in the screen display:
an intraluminal ultrasound image of the plurality of intraluminal ultrasound images; and
an indicator in the stylized graphic identifying a location of the intraluminal ultrasound image along a length of the body lumen.

6. The system of claim 5,
wherein the indicator is movable to a different location along the length of the body lumen in the stylized graphic, and
wherein the processor circuit is configured to output, via the screen display, the intraluminal ultrasound image corresponding to the different location.

7. The system of claim 5, wherein the processor circuit is configured to output the stylized graphic in a horizontal orientation or a vertical orientation.

8. The system of claim 1, wherein the processor circuit is configured to:
identify a treatment device positioned within the body lumen, based on the plurality of intraluminal ultrasound images; and
output, via the screen display, an illustration of the treatment device in the stylized graphic.

9. The system of claim 1, wherein the processor circuit is configured to:
receive a further plurality of intraluminal ultrasound images obtained after a treatment device is positioned within the body lumen;
generate a further stylized graphic of the body lumen based on the further plurality of intraluminal ultrasound images; and output, via the screen display, the further stylized graphic proximate to the stylized graphic.

10. The system of claim 9, wherein the processor circuit is configured to output, via the screen display, an intraluminal ultrasound image of the plurality of ultrasound images and a further intraluminal ultrasound image of the further plurality of ultrasound images.

11. The system of claim 1,
wherein the body lumen comprises a plurality of segments,
wherein the processor circuit is configured to:
perform an automatic measurement for each of the plurality of segments, based on the plurality of intraluminal ultrasound images; and
output, via the screen display, the automatic measurement proximate to each of the plurality of segments in the stylized graphic.

12. The system of claim 11, wherein the automatic measurement comprises at least one of an area, a diameter, a length, a compression percentage, or an improvement percentage.

13. The system of claim 12, wherein the automatic measurement is displayed as at least one of a numerical value, a difference from a reference numerical value, a ratio of the reference numerical value, or a percentage of the reference numerical value.

14. The system of claim 1, wherein the processor circuit is configured to:
perform an automatic measurement for the body lumen, based on the plurality of intraluminal ultrasound images;
identify at least one of a reference location or a target location, wherein the reference location corresponds to a healthy portion of the body lumen and the target location corresponds to a diseased or compressed portion of the body lumen; and
output at least one of the reference location or a target location on the stylized graphic.

15. The system of claim 14,
wherein the body lumen comprises a plurality of segments,
wherein the processor circuit is configured to identify at least one of the reference location or the target location for each of the plurality of segments, and
output the at least one of the reference location or the target location for each of the plurality of segments on the stylized graphic.

16. An intraluminal ultrasound imaging method, comprising:
receiving, at a processor circuit in communication with an intraluminal ultrasound imaging catheter, a plurality of intraluminal ultrasound images obtained by the intraluminal ultrasound imaging catheter while the intraluminal ultrasound imaging catheter is moved through a body lumen of a patient,
wherein the plurality of intraluminal ultrasound images comprise axial cross-sectional views of the body lumen;
generating, with the processor circuit, an image-based display of the body lumen based on the plurality of intraluminal ultrasound images;
generating, with the processor circuit, a stylized graphic of the body lumen based on the plurality of intraluminal ultrasound images, wherein the image-based display and the stylized graphic comprise alternative visual depictions of a same view of the body lumen, wherein the same view of the body lumen comprises a longitudinal cross-sectional view of the body lumen; and outputting, to a display in communication with the processor circuit, a screen display comprising:
an area for the longitudinal cross-sectional view of the body lumen; and
a mode selector permitting a user to change a type of display; and
receiving an individual user input via the mode selector, wherein the area comprises only one of the image-based display or the stylized graphic in response to the individual user input,
wherein the mode selector is displayed proximate to the area in the screen display when the area comprises the image-based display and when the area comprises the stylized graphic such that:
the individual user input switches the area to the image-based display when the area comprises the stylized graphic; and
the individual user input switches the area to the stylized graphic when the area comprises the image-based display,
wherein the mode selector is specific to selecting between the image-based display and the stylized graphic such that the mode selector is configured only to switch the area between the alternative visual depictions of the same view of the body lumen.

17. An intravascular imaging system for use in vasculature, the system comprising:
an intravascular imaging catheter configured to obtain a plurality of intravascular images while the intravascular imaging catheter is moved through a blood vessel of a patient;
a processor circuit configured for communication with the intravascular imaging catheter, wherein the processor circuit is configured to:
receive the plurality of intravascular images obtained by the intravascular imaging catheter, wherein the plurality of intravascular images comprise axial cross-sectional views of the blood vessel;
generate an image-based display of the blood vessel using the plurality of intravascular images;
generate a stylized graphic of the blood vessel based on the plurality of intravascular images, wherein the image-based display and the stylized graphic comprise alternative visual depictions of a same view of the blood vessel, wherein the same view of the blood vessel comprises a longitudinal cross-sectional view of the blood vessel;
output, to a display in communication with the processor circuit, a screen display comprising:
an area for the longitudinal cross-sectional view of the blood vessel; and
a mode selector configured to permit a user to change a type of display; and
receive an individual user input via the mode selector, wherein the area comprises only one of the image-based display or the stylized graphic in response to the individual user input, wherein the mode selector is displayed proximate to the area in the screen display when the area comprises the image-based display and when the area comprises the stylized graphic such that:
the individual user input is configured to switch the area to the image-based display when the area comprises the stylized graphic; and
the individual user input is configured to switch the area to the stylized graphic when the area comprises the image-based display,
wherein the mode selector is specific to selecting between the image-based display and the stylized graphic such that the mode selector is configured only to switch the area between the alternative visual depictions of the same view of the blood vessel.

18. The system of claim 1, wherein the processor circuit is further configured to:
receive, after deployment of a treatment device, a second plurality of intraluminal ultrasound images obtained by the intraluminal ultrasound imaging catheter while the intraluminal ultrasound imaging catheter is moved through the body lumen of the patient, wherein the second plurality of intraluminal ultrasound images comprise axial cross-sectional views of the body lumen and the treatment device;
generate a second stylized graphic of the body lumen based on the second plurality of intraluminal ultrasound images, wherein the second stylized graphic of the body lumen comprises a longitudinal illustration of the treatment device within the longitudinal cross-sectional view of the body lumen; and
output the second stylized graphic to the display.

19. The system of claim 1,
wherein the mode selector comprises a first selectable element specific to the image-based display and a second selectable element specific to the stylized graphic,
wherein a visual appearance of the first selectable element represents the image-based display and a visual appearance of the second selectable element represents the stylized graphic,
wherein the first selectable element and the second selectable element are displayed in the screen display proximate to the area when the area comprises the image-based display and when the area comprises the stylized graphic,
wherein the processor circuit is further configured to:
receive a first user input selecting the first selectable element;
include the image-based display in the area in response to the first user input;
receive a second user input selecting the second selectable element; and
include the stylized graphic in the area in response to the second user input.

* * * * *